United States Patent
Iijima et al.

(10) Patent No.: US 7,583,058 B2
(45) Date of Patent: Sep. 1, 2009

(54) METHOD OF CHARGING LITHIUM ION SECONDARY BATTERY INCLUDING A CONSTANT CURRENT, CHARGING APPARATUS, AND POWER SUPPLY APPARATUS

(75) Inventors: Tsuyoshi Iijima, Chuo-ku (JP); Kazuya Ogawa, Chuo-ku (JP); Toshifumi Tanaka, Chuo-ku (JP); Satoshi Maruyama, Chuo-ku (JP)

(73) Assignee: TDK Corporation, Tokyo (JP)

( * ) Notice: Subject to any disclaimer, the term of this patent is extended or adjusted under 35 U.S.C. 154(b) by 280 days.

(21) Appl. No.: 10/986,956

(22) Filed: Nov. 15, 2004

(65) Prior Publication Data

US 2005/0194934 A1 Sep. 8, 2005

(30) Foreign Application Priority Data

Nov. 20, 2003 (JP) ............................... 2003-390858

(51) Int. Cl.
 *H02J 7/00* (2006.01)
(52) U.S. Cl. ..................... 320/128; 320/107; 429/231.1
(58) Field of Classification Search .............. 429/231.1, 429/231.9, 231.95; 320/107, 128
See application file for complete search history.

(56) References Cited

U.S. PATENT DOCUMENTS

| | | | | |
|---|---|---|---|---|
| 6,387,564 B1 * | 5/2002 | Yamashita et al. | .......... | 429/132 |
| 6,482,546 B1 * | 11/2002 | Ohshita et al. | ........... | 429/231.1 |
| 6,551,746 B1 * | 4/2003 | Vitins et al. | .............. | 429/231.1 |
| 6,824,923 B2 * | 11/2004 | Che et al. | ................. | 429/231.1 |
| 6,835,496 B1 * | 12/2004 | Kaminaka et al. | ......... | 429/218.1 |
| 2001/0031401 A1 * | 10/2001 | Yamawaki et al. | ........ | 429/231.1 |
| 2002/0015888 A1 * | 2/2002 | Omaru et al. | ............ | 429/231.8 |
| 2002/0034678 A1 * | 3/2002 | Shibuya et al. | ................ | 429/50 |
| 2002/0061443 A1 | 5/2002 | Nakanishi et al. | | |
| 2002/0114993 A1 * | 8/2002 | Miyaki et al. | ................ | 429/137 |
| 2002/0127472 A1 * | 9/2002 | Terashima et al. | ..... | 429/231.95 |
| 2003/0031923 A1 * | 2/2003 | Aoshima et al. | ............ | 429/127 |
| 2003/0073002 A1 * | 4/2003 | Imachi et al. | ............. | 429/231.3 |
| 2003/0082452 A1 * | 5/2003 | Ueda et al. | ............... | 429/231.1 |
| 2003/0148189 A1 * | 8/2003 | Yamaki et al. | .............. | 429/324 |
| 2003/0180626 A1 * | 9/2003 | Shima et al. | ................ | 429/326 |
| 2003/0228519 A1 * | 12/2003 | Nakura et al. | ................ | 429/223 |
| 2004/0053083 A1 * | 3/2004 | Kobayashi et al. | ............. | 429/9 |
| 2004/0072072 A1 * | 4/2004 | Suzuki et al. | ............. | 429/231.1 |
| 2004/0086445 A1 * | 5/2004 | Armand et al. | ............. | 423/306 |
| 2004/0202933 A1 * | 10/2004 | Yamaki et al. | ............ | 429/231.1 |

(Continued)

FOREIGN PATENT DOCUMENTS

CN 1165592 A 11/1997

(Continued)

*Primary Examiner*—Edward Tso
*Assistant Examiner*—Arun Williams
(74) *Attorney, Agent, or Firm*—Oliff & Berridge, PLC

(57) ABSTRACT

The method of charging a lithium ion secondary battery uses a lithium ion secondary battery comprising a positive electrode including a mixed metal oxide containing at least Li, Mn, and Ni as metal components as a positive electrode active material, a negative electrode, and a nonaqueous electrolytic solution containing a lithium salt; and includes a constant current charging step of carrying out constant current charging with a set charging current value I1 corresponding to a set value nC satisfying the condition represented by the expression of $2C \leqq nC \leqq 60C$, where C is a rated capacity value of the lithium ion secondary battery, and n is a number of 2 to 60.

14 Claims, 11 Drawing Sheets

U.S. PATENT DOCUMENTS

| | | | |
|---|---|---|---|
| 2005/0069758 A1* | 3/2005 | Kitao et al. | 429/50 |
| 2005/0069777 A1* | 3/2005 | Takami et al. | 429/245 |
| 2005/0100795 A1* | 5/2005 | Utsugi et al. | 429/326 |
| 2005/0194934 A1* | 9/2005 | Iijima et al. | 320/128 |
| 2006/0061330 A1* | 3/2006 | Sato et al. | 320/125 |
| 2006/0093916 A1* | 5/2006 | Howard et al. | 429/231.95 |
| 2006/0121335 A1* | 6/2006 | Seyama | 429/50 |
| 2006/0194109 A1* | 8/2006 | Watanabe et al. | 429/231.1 |
| 2006/0204848 A1* | 9/2006 | Franger et al. | 429/231.1 |
| 2007/0009801 A1* | 1/2007 | Inagaki et al. | 429/231.95 |
| 2007/0026313 A1* | 2/2007 | Sano | 429/217 |

FOREIGN PATENT DOCUMENTS

| | | |
|---|---|---|
| CN | 1345101 A | 4/2002 |
| JP | A 05-111184 | 4/1993 |
| JP | A 06-084542 | 3/1994 |
| JP | A 2001-143702 | 5/2001 |
| JP | A 2002-246070 | 8/2002 |
| WO | WO 97/06591 | 2/1997 |

\* cited by examiner

METHOD OF CHARGING LITHIUM ION SECONDARY BATTERY INCLUDING A CONSTANT CURRENT, CHARGING APPARATUS, AND POWER SUPPLY APPARATUS

BACKGROUND OF THE INVENTION

1. Field of the Invention

The present invention relates to a method of charging a lithium ion secondary battery, a charging apparatus, and a power supply apparatus.

2. Related Background Art

Many lithium ion secondary batteries have been in use as batteries for driving devices such as cellular phones, notebook PCs, and PDAs, because of their high capacity, high energy density, excellent charging/discharging cycle characteristic, ability to keep a rated output for a long period, etc.

A constant current constant voltage (CCCV) scheme has usually been employed for charging a lithium ion secondary battery. In the constant current constant voltage scheme, the battery is initially charged to a predetermined upper limit voltage by a constant current, and then is held at this voltage. Since the current value decays in the constant voltage mode, the charging is terminated at the time when a predetermined current value is attained (see, for example, Japanese Patent Application Laid-Open No. HEI 5-111184).

SUMMARY OF THE INVENTION

Since lithium ion secondary batteries use nonaqueous solvents having a large electric resistance as solvents for electrolytic solutions, it takes a long time to charge the batteries completely. Power supplies for driving portable, cordless devices such as those mentioned above have been needed to be capable of rapid charging, so that the time required for charging the lithium ion secondary batteries has been desired to be shortened.

For shortening the charging time in the above-mentioned constant current constant voltage charging method, the charging may be carried out while setting the charging current value higher in the constant current charging zone or while setting the upper limit voltage value higher. When lithium ion secondary batteries using $LiCoO_2$ as a positive electrode active material and the like are charged with an excessively large current or high voltage, however, Li is desorbed from within the anode active material so ouch that lattices are broken, whereby the charging/discharging characteristic deteriorates. Therefore, conventional lithium ion secondary batteries whose negative electrode active material is a carbon-based material have been required to be subjected to constant current charging at 1CA [current value corresponding to the rated capacity value (Ah) of the lithium ion secondary batteries] or less while setting the upper limit voltage value to +4.2 V, and then to constant voltage charging while regulating the charging voltage value with a high accuracy of +4.2 V±0.05 V. In the case where the negative electrode active material is lithium titanate, the upper limit voltage value and the voltage value in the constant voltage charging have been required to be regulated at +2.7 V and +2.7 V±0.05 V, respectively. Charging under such a condition has usually taken a charging time of about 2 to 8 hours.

In view of problems inherent in the prior art mentioned above, it is an object of the present invention to provide a method of charging a lithium ion secondary battery, a charging apparatus, and a power supply apparatus which enable charging in a time shorter than that conventionally required without remarkably deteriorating the charging/discharging cycle characteristic.

The inventors conducted diligent studies in order to achieve the above-mentioned object and, as a result, have found it quite effective for achieving the above-mentioned object to use a specific mixed metal oxide as a positive electrode active material and dare to carry out constant current charging at a specific current value corresponding to a value exceeding a rated capacity value of a battery, though it has conventionally been a common knowledge of those skilled in the art to carry out constant current charging at 1CA [current value corresponding to the rated capacity value (Ah) of a lithium ion secondary battery].

Namely, the method of charging a lithium ion secondary battery in accordance with the present invention uses a lithium ion secondary battery comprising a positive electrode including a mixed metal oxide containing at least Li, Mn, and Ni as metal components as a positive electrode active material, a negative electrode, and a nonaqueous electrolytic solution containing a lithium salt; and includes a constant current charging step of carrying out constant current charging with a set charging current value I1 corresponding to a set value nC satisfying the condition represented by the following expression (1):

$$2C \leq nC \leq 60C \tag{1}$$

where C is a rated capacity value of the lithium ion secondary battery, and n is a number of 2 to 60.

In the present invention, electrodes to become the negative electrode and positive electrode act as reaction fields which can advance an electron transfer reaction in which a lithium ion (or metal lithium) is involved as an oxidizing/reducing species. On the other hand, "advance an electron transfer reaction" refers to advancing the above-mentioned electron transfer reaction within the range of a battery life required as a power supply or auxiliary power supply of a device to which the battery is mounted. In the specification, "negative electrode" is an electrode which is based on the polarity of the battery at the time of discharging and emits an electron upon an oxidizing reaction at the time of discharging. On the other hand, "positive electrode" is an electrode which is based on the polarity of the battery at the time of discharging and receives an electron upon a reducing reaction at the time of discharging.

The set charging current value I1 is set to a value corresponding to a set value nC satisfying the condition represented by the above-mentioned expression (1). When charging is effected by constant current charging alone while the rated capacity value (C) of the lithium ion secondary battery in use is set to 1 Ah (1000 mAh), for example, the set charging current value I1 is set to a value corresponding to a set value nC set within the range of 2C to 60C, whereby the actual set charging current value I1 is a current value set within the range of 2 A (2000 mA) to 60 A (60000 mA). The unit for the set charging current value I1 is A and mA when the rated capacity value C in use is represented by the units of Ah and mAh, respectively. When n is 5, and the rated capacity value C is 1 Ah, for example, nC is 5 Ah, and the set charging current value I1 corresponding thereto is 5 A. The current value in this case is a current value at which a battery having a rated capacity value C of 1 Ah is fully charged from a completely discharged state in 12 minutes. When n is 10, and the rated capacity value C is 100 mAh, nC is 1000 mAh, and the set charging current value I1 corresponding thereto is 1000 mA. The current value in this case is a current value at which a battery having a rated capacity value C of 100 mAh is fully charged from a completely discharged state in 6 minutes.

Since the method of charging a lithium ion secondary battery in accordance with the present invention uses a lithium ion secondary battery having a positive electrode including a mixed metal oxide containing at least Li, Mn, and Ni as metal components as a positive electrode active material, and includes a constant current charging step with a set charging current value satisfying the above-mentioned condition, it can charge the battery in a charging time shorter than that conventionally required without remarkably lowering the charging/discharging cycle characteristic of the lithium ion secondary battery.

When the set charging current value I1 is less than the current value corresponding to 2C, the effect of shortening the charging time is insufficient. When the set charging current value I1 exceeds 60C, on the other hand, polarization becomes stronger, thus decomposing the electrolytic solution and deteriorating the electrode active materials, whereby the effect of the present invention cannot be obtained.

From the viewpoint of attaining the effect of the present invention easily and reliably, it will be preferred in the present invention if the mixed metal oxide is one simultaneously satisfying the conditions represented by the following general expressions (I) to (IV):

$$Li_xMn_yNi_zCo_{(1-y-z)}O_2 \quad (I)$$

$$0.85 \leq X \leq 1.1 \quad (II)$$

$$0.1 \leq Y \leq 0.5 \quad (III)$$

$$0.2 \leq Z \leq 0.8 \quad (IV)$$

where X, Y, and Z in expression (I) indicate values simultaneously satisfying the conditions of expressions (II) to (IV).

The charging/discharging capacity of active materials per gram tends to decrease when X in the above-mentioned general formula (I) is less than 0.85 or exceeds 1.1. The thermal stability of active materials tends to deteriorate when Y is less than 0.1, whereas the charging/discharging capacity of active materials per gram tends to decrease when Y exceeds 0.5. The charging/discharging capacity of active materials per gram tends to decrease when Z is less than 0.2, whereas the thermal stability of active materials tends to deteriorate when Z exceeds 0.8.

From the viewpoint of attaining the effect of the present invention easily and reliably, it will be preferred if the set charging current value I1 in the method of charging a lithium ion secondary battery in accordance with the present invention is a charging current value corresponding to a set value nC satisfying the condition represented by the following expression (2):

$$2C \leq nC \leq 30C \quad (2)$$

where C is defined as in the above-mentioned general expression (1), and n is defined as in the above-mentioned general expression (1).

From the viewpoint of more reliably shortening the charging time, it will be preferred in the present invention if the set charging current value I1 is a charging current value corresponding to a set value nC satisfying the condition represented by the following expression (7):

$$5C \leq nC \leq 30C \quad (7)$$

where C is defined as in the above-mentioned general expression (1), and n is defined as in the above-mentioned general expression (1).

The present invention may be configured such that, while monitoring a potential of an anode [V vs. SHE] in the constant current charging step, the constant current charging is carried out until the potential of the anode reaches a set potential E1 within the range of +1.3 V to +2.0 V. Monitoring the potential as such enables rapid charging while more reliably preventing the electrolytic solution from decomposing, and the electrode active materials from deteriorating.

In the present invention, "anode" refers to an electrode which is electrically connected to a positive electrode ((+) electrode) of an external power supply at the time of charging, so that an oxidizing reaction advances therein, and an electron is emitted therefrom. The "anode" is an electrode which functions as the above-mentioned "positive electrode" of the lithium ion secondary battery. On the other hand, "SHE" refers to the potential of a standard hydrogen electrode, i.e., 0 V.

The charging/discharging cycle characteristic tends to deteriorate greater when the set potential E1 exceeds +2.0 V. The effect of shortening the charging time becomes smaller when the set potential E1 is less than +1.3 V. Therefore, the set potential E1 is preferably within the above-mentioned range.

Preferably, the method further comprises a constant voltage charging step of regulating a charging voltage constantly so as to keep the set potential E1 after the constant current charging step, whereas the constant voltage charging step monitors a decaying state of the charging current value and carries out constant voltage charging until the current value reaches a set current value I2. Regulating the charging voltage as such enables rapid charging while more reliably preventing the electrolytic solution from decomposing, the electrode active materials from deteriorating, and overcharging from occurring.

Here, "set current value I2" is a value set based on a charging rate set according to a charging/discharging characteristic of the lithium ion secondary battery to be used. The "charging rate" is the ratio (Ci/C0) of the charging capacity Ci increasing as the charging proceeds to the charging capacity C0 at the time of full charge. For example, the set current value I2 may be set such that the charging can continue until the full charge is attained, i.e., Ci/C0 becomes 1.0, or such that the charging is terminated at a point where Ci/C0 is 0.9.

The present invention may be configured such that the negative electrode contains a conductive carbon material as a negative electrode active material, whereas the constant current charging step monitors a battery voltage and carries out the constant current charging until the voltage reaches, a set voltage value ΔE1 within the range of +4.3 V to +5.0 V. Monitoring the voltage as such enables rapid charging while more reliably preventing the electrolytic solution from decomposing, and the electrode active materials from deteriorating.

The charging/discharging cycle characteristic tends to deteriorate more when the set voltage value ΔE1 exceeds +5.0 V. The effect of shortening the charging time decreases when the set voltage value ΔE1 is less than +4.3 V. Therefore, it will be preferred if the set voltage value ΔE1 is within the above-mentioned range.

The method may further comprises a constant voltage charging step of regulating a charging voltage constantly so as to keep the set voltage value ΔE1 after the constant current charging step, whereas it will be preferred if the constant voltage charging step monitors a decaying state of the charging current value and carries out constant voltage charging until the current value reaches a set current value I2. Regulating the charging voltage as such enables rapid charging while more reliably preventing the electrolytic solution from decomposing, the electrode active materials from deteriorating, and overcharging from occurring.

The set current value I2 is a value set eased on the charging rate set according to the charging/discharging characteristic of the lithium ion secondary battery to be used as mentioned above.

The present invention may be configured such that the negative electrode contains lithium titanate as a negative electrode active material, whereas the constant current charging step monitors a battery voltage and carries out the constant current charging until the voltage reaches a set voltage value ΔE1 within the range of +2.8 V to +3.5 V. Monitoring the voltage as such enables rapid charging while more reliably preventing the electrolytic solution from decomposing, and the electrode active materials from deteriorating.

The charging/discharging cycle characteristic tends to deteriorate more when the set voltage value ΔE1 exceeds +3.5 V. The effect of shortening the charging time decreases when the set voltage value ΔE1 is less than +2.8 V. Therefore, it will be preferred if the set voltage value ΔE1 is within the above-mentioned range.

The method may further comprise a constant voltage charging step of regulating a charging voltage constantly so as to keep the set voltage value ΔE1 after the constant current charging step, whereas it will be preferred if the constant voltage charging step monitors a decaying state of the charging current value and carries out constant voltage charging until the current value reaches a set current value I2. Regulating the charging voltage as such enables rapid charging while more reliably preventing the electrolytic solution from decomposing, the electrode active materials from deteriorating, and overcharging from occurring.

The set current value I2 is a value set based on the charging rate set according to the charging/discharging characteristic of the lithium ion secondary battery to be used as mentioned above.

The present invention may be configured such that, while monitoring a potential of an anode [V vs. SHE], the constant current charging step carries out the constant current charging until the potential reaches +1.2 V, and the method further comprises a constant voltage charging step of regulating a charging voltage constantly so as to keep the potential after the constant current charging step, whereas the constant voltage charging step monitors a decaying state of the charging current value and carries out constant voltage charging until the current value reaches a set current value I2. Further providing the constant voltage charging step satisfying such a charging condition enables rapid charging while more reliably preventing the electrolytic solution from decomposing, the electrode active materials from deteriorating, and overcharging from occurring.

The set current value I2 is a value set based on the charging rate set according to the charging/discharging characteristic of the lithium ion secondary battery to be used as mentioned above.

The present invention may be configured such that the negative electrode contains a conductive carbon material as a negative electrode active material, the constant current charging step monitors a battery voltage and carries out the constant current charging until the voltage reaches +4.2 V, and the method further comprises a constant voltage charging step of regulating a charging voltage constantly so as to keep a potential after the constant current charging step, whereas the constant voltage charging step monitors a decaying state of the charging current value and carries out constant voltage charging until the current value reaches a set current value I2. Further providing the constant voltage charging step satisfying such a charging condition enables rapid charging while more reliably preventing the electrolytic solution from decomposing, the electrode active materials from deteriorating, and overcharging from occurring.

The set current value I2 is a value set based on the charging rate set according to the charging/discharging characteristic of the lithium ion secondary battery to be used as mentioned above.

The present invention may be configured such that the negative electrode contains lithium titanate as a negative electrode active material, the constant current charging step monitors a battery voltage and carries out the constant current charging until the voltage reaches +2.7 V, and the method further comprises a constant voltage charging step of regulating a charging voltage constantly so as to keep a potential after the constant current charging step, whereas the constant voltage charging step monitors a decaying state of the charging current value and carries out constant voltage charging until the current value reaches a set current value I2. Further providing the constant voltage charging step satisfying such a charging condition enables rapid charging while more reliably preventing the electrolytic solution from decomposing, the electrode active materials from deteriorating, and overcharging from occurring.

The set current value I2 is a value set based on the charging rate set according to the charging/discharging characteristic of the lithium ion secondary battery to be used as mentioned above.

From the viewpoint of attaining the effect of the present invention easily and reliably, it will be preferred if a solvent contained in the nonaqueous electrolytic solution is constituted by propylene carbonate, ethylene carbonate, and diethyl carbonate, whereas the content α [vol %] of propylene carbonate, content β [vol %] of ethylene carbonate, and content γ [vol %] of diethyl carbonate in the solvent simultaneously satisfy the conditions represented by the following expressions (3) to (6):

$$10 \leq \alpha \leq 60 \tag{3}$$

$$1 \leq \beta \leq 20 \tag{4}$$

$$30 \leq \gamma \leq 85 \tag{5}$$

$$\alpha + \beta + \gamma = 100 \tag{6}$$

When the content α is less than 10 vol %, the charging/discharging characteristic at a low temperature tends to become insufficient. When the content α exceeds 60 vol %, on the other hand, propylene carbonate tends to decompose, whereby reliability is likely to become insufficient. When the content β is less than 1 vol %, propylene carbonate tends to decompose, whereby reliability is likely to become insufficient. When the content β exceeds 20 vol %, on the other hand, the charging/discharging characteristic tends to become insufficient at a low temperature (−20° C. to 25° C.). When the content γ is less than 30 vol %, the high rate discharging characteristic and the charging/discharging characteristic at a low temperature tend to become insufficient. When the content γ exceeds 85 vol %, on the other hand, the discharging capacity tends to decrease.

In another aspect, the present invention provides a charging apparatus for charging a lithium ion secondary battery to be charged, the apparatus comprising, at least, a power supply part for supplying power to the lithium ion secondary battery, and a charging control part for controlling the power supply part according to any of the above-mentioned charging methods so as to regulate the charging rate of the lithium ion secondary battery upon charging.

The charging apparatus of the present invention controls the charging according to the method of charging a lithium ion secondary battery in accordance with the present invention, and thus enables rapid charging in a time shorter than that conventionally required without remarkably deteriorating the charging/discharging cycle characteristic.

Here, the power supply part for supplying power to the lithium ion secondary battery may generate the power by itself or take the power therein from the outside. Examples of the one generating the power by itself include devices which convert mechanical work into the power, devices which convert energy of heat, light, or the like into the power, and devices (e.g., fuel batteries) which generate the power by a chemical reaction. An examples of the power from the outside is power from a general home AC outlet.

When necessary, the power supply part in the present invention may be provided with known voltage step-down transformers, AC/DC converters, constant current output parts, constant voltage output parts, and the like so that an appropriate charging current can be supplied to the battery. For example, when the power supply is of AC type, the power supply part may further comprise an AC/DC converter.

In still another aspect, the present invention provides a power supply apparatus comprising, at least, a lithium ion secondary battery, and the above-mentioned charging apparatus for charging the lithium ion secondary battery.

In the power supply apparatus in accordance with the present invention, the charging apparatus provided therein controls the charging according to the method of charging a lithium ion secondary battery in accordance with the present invention. This allows the lithium ion secondary battery provided therein to accumulate the power in a time shorter than that conventionally required without remarkably deteriorating the charging/discharging cycle characteristic, and to be used as a main power and/or auxiliary power.

The present invention can provide a method of charging a lithium ion secondary battery, a charging apparatus, and a power supply apparatus which make it possible to carry out charging in a time shorter than that conventionally required without remarkably deteriorating the charging/discharging cycle characteristic.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the method of charging a lithium ion secondary battery, charging apparatus, and power supply apparatus in accordance with the present invention will be explained in detail with reference to the drawings. In the following explanation, parts identical or equivalent to each other will be referred to with numerals identical to each other without repeating their overlapping descriptions.

First, a preferred example of lithium ion secondary battery to which the method of charging a lithium ion secondary battery in accordance with the present invention is applied will be explained.

Figure 1:
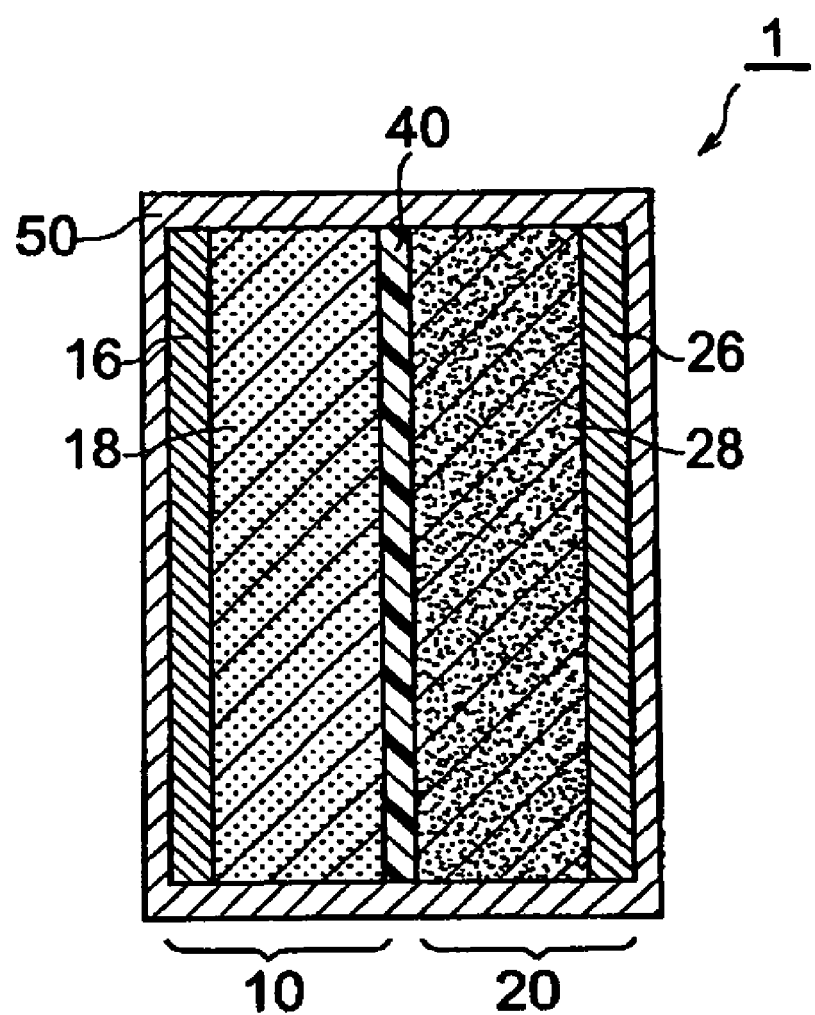
FIG. 1 is a view showing the configuration of an example of lithium ion secondary battery used in the present invention.

FIG. 1 is a schematic sectional view showing the basic configuration of a preferred example of a lithium ion secondary battery to which the method of charging a lithium ion secondary battery in accordance with the present invention is applied. As shown in FIG. 1, this lithium ion secondary battery 1 is mainly constituted by a sheet-shaped negative electrode 10 and a sheet-shaped positive electrode 20 which oppose each other, a sheet-shaped separator 40 disposed between the negative electrode 10 and positive electrode 20 adjacent thereto, a nonaqueous electrolytic solution, and a case 50 which accommodates them in a sealed state. The negative electrode 10, positive electrode 20, and separator are impregnated with the nonaqueous electrolytic solution (not depicted). The "sheet-shaped" encompasses both flat and curved sheet states.

For convenience of explanation, "negative electrode 10" and "positive electrode 20" are determined with reference to polarities of the lithium ion secondary battery 1 at the time of discharging. Therefore, "negative electrode 10" and "positive electrode 20" become "cathode" and "anode", respectively, at the time of charging.

As shown in FIG. 1, the negative electrode 10 comprises a collector 16 and a negative electrode active material containing layer 18 formed on the collector 16. The positive electrode 20 comprises a collector 26 and a positive electrode active material containing layer 28 formed on the collector 26. The collectors 16 and 26 are not restricted in particular as long as they are conductors which can fully transfer electric charges to the negative electrode active material containing layer 18 and positive electrode active material containing layer 28, whereby known collectors used in lithium ion secondary batteries can be employed. Examples of the collectors 16 and 26 include foils of metals such as aluminum and copper.

The negative electrode active material containing layer 18 of the negative electrode, 10 is mainly constituted by a negative electrode active material, a conductive auxiliary agent, and a binder.

The negative electrode active material is not restricted in particular, and any known negative electrode active material can be used as long as it can reversibly advance the occlusion/release of lithium ions, the desorption/insertion (deintercalation/intercalation) of lithium ions, or the doping/undoping of lithium ions and their counterions (e.g., $ClO_4^-$) Examples of such an active material include carbon materials such as natural graphite and synthetic graphite (carbon which is hard to graphitize, carbon which is easy to graphitize, carbon which can be fired at a low temperature, etc.); metals such as Al, Si, and Sn which can combine with lithium; amorphous compounds mainly composed of oxides such as $SiO_2$ and $SnO_2$; and lithium titanate ($Li_4Ti_5O_{12}$).

In particular, a conductive carbon material (graphite or amorphous carbon) or lithium titanate is preferred as the negative electrode active material. More preferred as the carbon material is one having an interlayer distance $d_{002}$ of 0.335 to 0.338 nm and a crystallite size $Lc_{002}$ of 30 to 120 nm. Examples of the carbon material satisfying such a condition include synthetic graphite and MCF (mesocarbon fiber). The interlayer distance $d_{002}$ and crystallite size $Lc_{002}$ can be determined by X-ray diffraction.

The conductive auxiliary agent is not restricted in particular, whereby known conductive auxiliary agents can be used. Examples of the conductive auxiliary agent include carbon blacks; carbon materials; fine powders of metals such as copper, nickel, and iron; mixtures of carbon materials and fine metal powders; and conductive oxides such as ITO.

The binder is not restricted in particular as long as it can bind particles of the negative electrode active material to particles of the conductive auxiliary agent. Its examples include fluorine resins such as polyvinylidene fluoride (PVDF), polytetrafluoroethylene (PTFE), tetrafluoroethylene/hexafluoropropylene copolymer (FEP), tetrafluoroethylene/perfluoroalkylvinyl ether copolymer (PFA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF). This binder contributes not only to binding particles of the negative electrode active material and conductive auxiliary agent to each other, but also to binding them to a foil (collector 16).

Preferably, the negative active material containing layer 18 contains an electronically conductive porous member. Examples of the electronically conductive porous member include carbon blacks such as acetylene black and Ketjen black.

As with the negative electrode active material containing layer 18, the positive electrode active material containing layer 28 of the positive electrode 20 is mainly constituted by a positive electrode active material, a conductive auxiliary agent, and a binder.

In the present invention, the positive electrode active material is required to be a mixed metal oxide containing, at least, Li, Mn, and Ni as metal components.

As mentioned above, from the viewpoint of attaining the effect of the present invention more reliably, it will be preferred if the above-mentioned mixed metal oxide is one simultaneously satisfying the conditions represented by the following general expressions (I) to (IV):

$$Li_xMn_yNi_zCo_{1-y-z}O_2 \quad (I)$$

$$0.85 \leq X \leq 1.1 \quad (II)$$

$$0.1 \leq Y \leq 0.5 \quad (III)$$

$$0.2 \leq Z \leq 0.8 \quad (IV)$$

where X, Y, and Z in expression (I) indicate values simultaneously satisfying the conditions of expressions (II) to (IV).

Employable as constituents other than the positive electrode active material contained in the positive electrode active material containing layer 28 are materials similar to those constituting the negative active material containing layer 18. The binder contained in the positive electrode active material containing layer 28 contributes not only to binding particles of the positive electrode active material and conductive auxiliary agent to each other, but also to binding them to a foil (collector 26). It will also be preferred if the positive electrode active material containing layer 28 contains an electronically conductive porous member.

The separator 40 disposed between the negative electrode 10 and positive electrode 20 is not restricted in particular as long as it is formed from an insulating porous member, whereby known separators used in lithium ion secondary batteries can be employed. Examples of the insulating porous member include laminates of films made of polyethylene, polypropylene, and polyolefin; extended films of mixtures of the resins mentioned above; and fibrous nonwoven made of at least one constituent material selected from the group consisting of cellulose, polyester, and polypropylene.

The inner space of the case 50 is filled with the nonaqueous electrolytic solution, a part of which is contained within the negative electrode 10, positive electrode 20, and separator 40. Employed as the nonaqueous electrolytic solution is one in which a lithium salt is dissolved in a nonaqueous solvent (organic solvent). Examples of the lithium salt include salts such as $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. These salts may be used either singly or in combination of two or more. Also, gelling agents such as gel polymers nay be added to the nonaqueous electrolytic solution, so as to yield a gel.

An example of the nonaqueous solvent in the nonaqueous electrolytic solution is one constituted by propylene carbonate, ethylene carbonate, and diethyl carbonate.

As mentioned above, from the viewpoint of attaining the effect of the present invention more reliably, it will be preferred if the content α [vol %] of propylene carbonate, content β [vol %] of ethylene carbonate, and content γ [vol %] of diethyl carbonate in the nonaqueous solvent simultaneously satisfy the conditions represented by the following expressions (3) to (6):

$$10 \leq \alpha \leq 60 \quad (3)$$

$$1 \leq \beta \leq 20 \quad (4)$$

$$30 \leq \gamma \leq 85 \quad (5)$$

$$\alpha + \beta + \gamma = 100 \quad (6)$$

The case 50 is formed from a flexible film. The film is lightweight and easy to become thinner, and thus allows the lithium ion secondary battery itself to attain a thin film form. This can easily improve the original volume energy density and a volume energy density based on the volume of a space in which the lithium ion secondary battery is to be placed.

From the viewpoint of effectively preventing moisture and air from entering the inside of the case 50 from the outside and electrolyte components from dissipating from the inside of the case 50 to the outside, it will be preferred if the film is a "composite package film" comprising, at least, an innermost layer made of a synthetic resin in contact with the nonaqueous electrolytic solution and a metal layer disposed on the upper side of the innermost layer. More preferably, the composite package film is constituted by at least three layers comprising an innermost layer in contact with the nonaqueous electrolytic solution, an outermost layer made of a synthetic resin disposed on the side of the outer surface of the case 50 farthest from the innermost layer, and at least one metal layer disposed between the innermost and outermost layers.

Though the innermost layer is not restricted in particular as long as it is a flexible synthetic resin having a chemical stability (characteristic of generating no chemical reaction, no dissolution, and no swelling) with respect to the nonaqueous electrolytic solution and a chemical stability with respect to oxygen and water (moisture in the air), materials further exhibiting a low permeability to oxygen, water (moisture in the air), and components of the nonaqueous electrolytic solution are preferred. Their examples include thermoplastic resins such as polyethylene, polypropylene, acid-denatured polyethylene, acid-denatured polypropylene, polyethylene ionomer, and polypropylene ionomer.

Preferably, the metal layer is a layer formed from a metal material exhibiting an anticorrosive property with respect to oxygen, water (moisture in the air), and the nonaqueous electrolytic solution. For example, metal foils made of aluminum, aluminum alloys, titanium, and chromium may be used.

Preferred embodiments of the method of charging a lithium ion secondary battery and charging apparatus in accordance with the present invention will now be explained.

Figure 2:
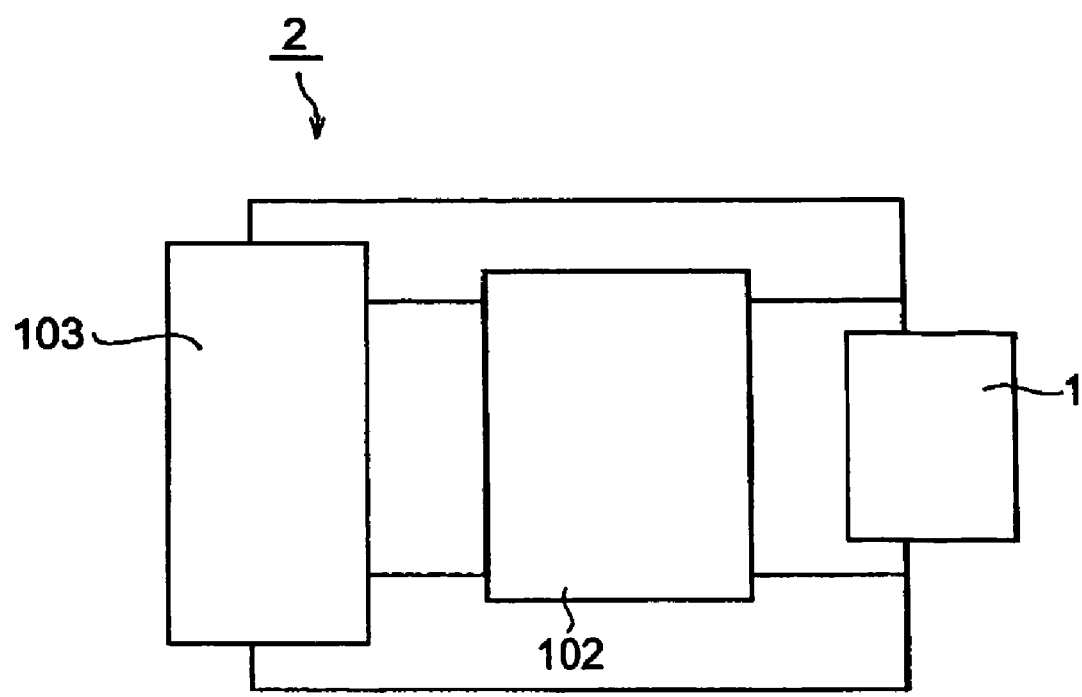
FIG. 2 is a system diagram showing the basic configuration of a preferred embodiment of the charging apparatus in accordance with the present invention.
Figure 3:
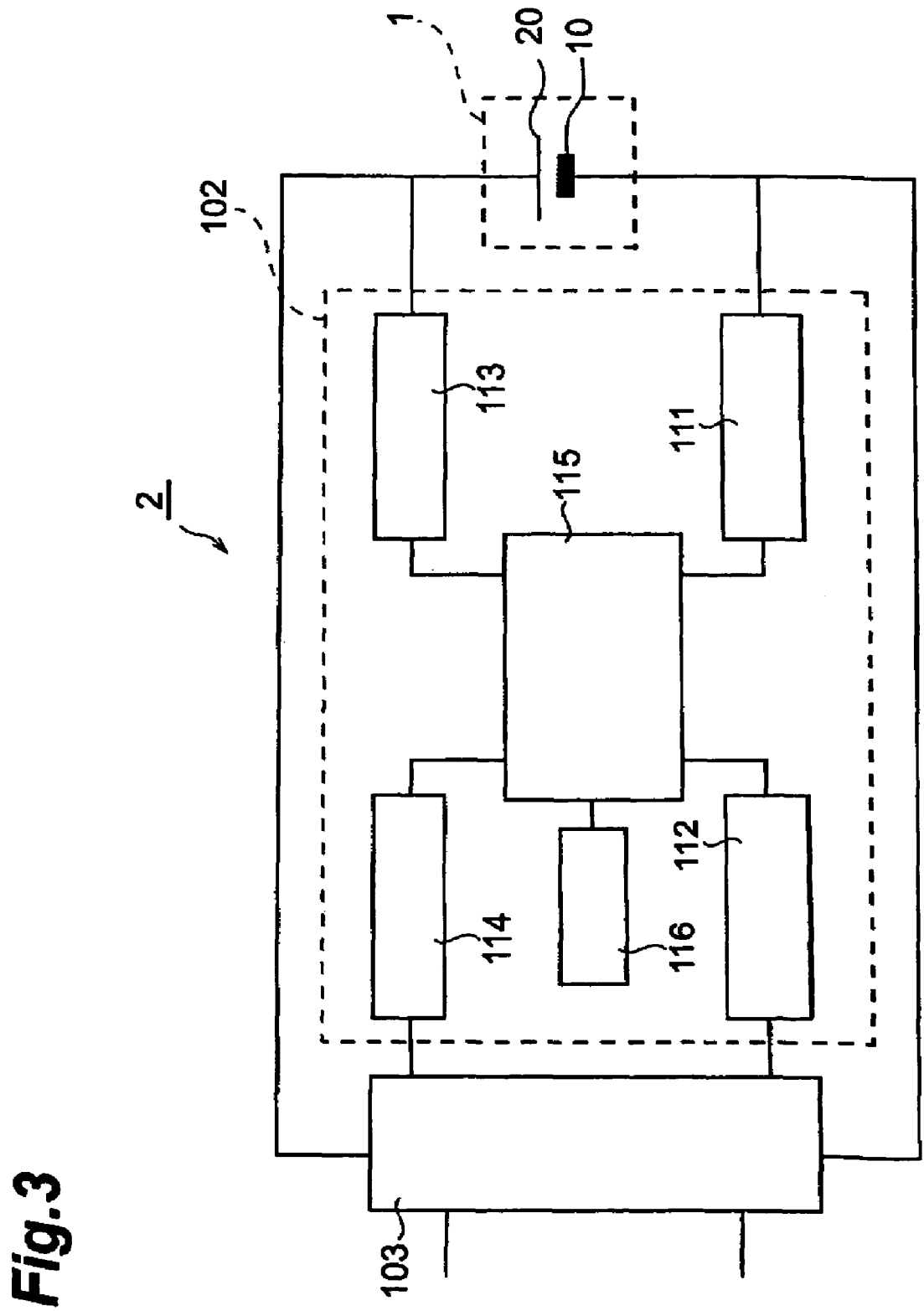
FIG. 3 is a system diagram showing the basic configuration of the preferred embodiment of the charging apparatus in accordance with the present invention.

FIGS. 2 and 3 are schematic diagrams showing the basic configuration of a predetermined embodiment of the charging apparatus in accordance with the present invention. The charging apparatus 2 shown in FIG. 2 has a configuration operable according to the method of charging a lithium ion secondary battery in accordance with the present invention, and comprises, at least, a power supply part 103 and a charging control part 102. The charging control part 102 is electrically connected to the power supply part 103, and further to the lithium ion secondary battery 1. The power supply part 103 and the lithium ion secondary battery 1 are electrically connected to each other. The charging control part 102 controls the power supply part 103 according to the method of charging a lithium ion secondary battery in accordance with the present invention, thereby charging the lithium ion secondary battery 1. It will be sufficient if the charging apparatus 2 is one having such a configuration that the power supply part 103 and the charging control part 102 are electrically connected to the lithium ion secondary battery 1. More specifically, it may have a configuration in which the lithium ion secondary battery is either always or detachably secured therein.

The configuration of the power supply part 103 is not restricted in particular as long as it can supply power to the lithium ion secondary battery 1 according to the method of charging a lithium ion secondary battery in accordance with the present invention. When a commercial 100-V power supply is used as an external power supply, for example, the power supply part 103 may function to lower the voltage of the power supplied from the external power supply, convert thus obtained AC current into a DC current, and supply the resulting DC current to the lithium ion secondary battery 1. In this case, the power supply part 103 may further comprise a voltage step-down transformer and an AC/DC converter, for example.

With reference to FIG. 3 showing an example of configuration of the charging control part 102, the control carried out by the charging control part 102 will now be explained in detail. The charging control part 102 of the charging apparatus 2 shown in FIG. 3 is constituted by a current detector 111, an output current controller 112, a voltage detector 113, an output voltage controller 114, a control unit 115, and a timer 116. The current detector 111 is a device which detects the charging current at the time of charging the lithium ion secondary battery 1, and is electrically connected to the lithium ion secondary battery 1 so as to be able to detect the charging current at the time of charging the lithium ion secondary battery 1. The current detector 111 also functions to detect the discharging current value at the time of discharging the lithium ion secondary battery 1 as necessary. The current detector 111 is further electrically connected to the control unit 115, and has such a configuration as to transmit detected data as electric signals to the control unit 115.

The voltage detector 113 is a device which detects the voltage of the lithium ion secondary battery 1 at the time of charging the lithium ion secondary battery 1, and is electrically connected to the lithium ion secondary battery 1 so as to be able to detect the voltage of the lithium ion secondary battery 1. The voltage detector 113 also functions to detect the voltage value of the lithium ion secondary battery 1 at the time of discharging as necessary. The voltage detector 113 is further electrically connected to the control unit 115, and has such a configuration as to transmit detected data as electric signals to the control unit 115.

The control unit 115 is an apparatus which functions to independently control the output current controller 112, which will be explained later, according to the charging current value I detected by the current detector 111 at the time of charging the lithium ion secondary battery 1. The control unit 115 also functions to independently control the output voltage controller 114, which will be explained later, according to the voltage value of the lithium ion secondary battery 1 detected by the voltage detector 113 at the time of charging the lithium ion secondary battery 1. The control unit 115 is constituted by CPU, ROM, RAM, a storage device, and an interface (which are not depicted), for example.

The timer 116 is electrically connected to the control unit 115, and functions to measure the charging time from the start of charging, and the charging time elapsed after switching the charging scheme from the constant current charging to the constant voltage charging. The timer 116 also functions to transmit the measured data as electric signals to the control unit 115. Apart from the control based on the data detected by the current detector 115 or voltage detector 113, the control unit 115 functions to take therein data concerning the charging time from the timer 116 and independently control the output current controller 112 and output voltage controller 114, which will be explained later.

The output current controller 112 is electrically connected to the control unit 115, and further to the power supply part 103. The output current controller 112 functions to regulate the output current of the power supply part 103 according to electric signals from the control unit 115. The output voltage controller 114 is electrically connected to the control unit 115, and further to the power supply part 103. The output voltage controller 114 functions to regulate the output voltage of the power supply part 103 according to electric signals from the control unit 115.

By controlling the output current controller 112 according to the charging current value detected by the current detector 111, the control unit 115 can carry out constant current charging which keeps a constant charging current. The control unit 115 can carry out the constant current charging for a predetermined period according to the data sent from the timer 116, for example. Alternatively, while monitoring the voltage of the battery detected by the voltage detector 113, the control unit 115 can carry out such control as to terminate the constant current charging at a point where the voltage of the battery becomes a predetermined value.

Also, by controlling the output voltage controller 114 according to the voltage value of the lithium ion secondary battery 1 detected by the voltage detector 113, the control unit 115 can carry out constant voltage charging which keeps a constant voltage value. The control unit 115 can carry out the constant voltage charging for a predetermined period according to the data sent from the timer 116, for example. Alternatively, while monitoring the charging current value detected by the current detector 111, the control unit 115 can carry out such control as to terminate the constant voltage charging at a point where, the charging current value becomes a predetermined value.

Thus, the charging apparatus 2 shown in FIG. 3 functions to carry out a constant current charging step and a constant voltage charging step, and can perform charging according to the method of charging a lithium ion secondary battery in accordance with the present invention. The configuration of the charging control part 102 is not limited to that mentioned above as long as it can carry out charging control according to the method of charging a lithium ion secondary battery in accordance with the present invention. For example, the timer 116 may be omitted.

A preferred embodiment of the method of charging a lithium ion secondary battery in accordance with the present invention using the charging apparatus 2 shown in FIG. 3 will now be explained.

Figure 4:
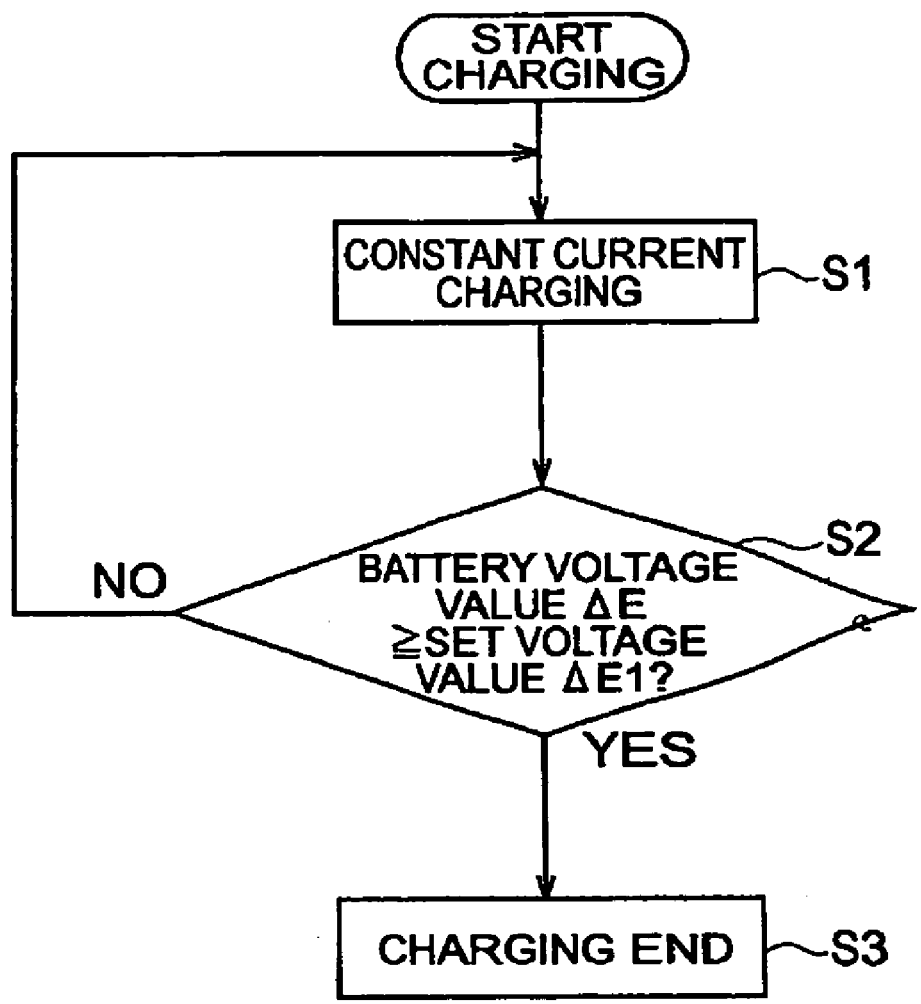
FIG. 4 is a flowchart showing a preferred example of the charging step in the method of charging a lithium ion secondary battery in accordance with the present invention.

FIG. 4 is a flowchart showing a preferred example of the method of charging a lithium ion secondary battery in accordance with the present invention. This flowchart shows an example of charging control procedure when carrying out constant current charging. A charging start condition (timing) may be set, for example, such that the control unit 115 monitors the voltage of the lithium ion secondary battery 1 detected by the voltage detector 113 at the time of discharging and automatically starts charging at the time when the charging rate determined according to the voltage value is less than a predetermined value, or such that a signal such as alarm is externally displayed when the charging rate is lower than a predetermined value, and the charging is started when a charging start signal is manually inputted. When the charging is started, the control unit 115 performs constant current charging at a set charging current value I1 (S1). At S1, the control unit 115 monitors the charging current value detected by the current detector 111 and controls the output current controller 112 such that the charging current value is constant at the set charging current value I1. Here, the set charging current value I1 is a current value corresponding to a set value nC satisfying the condition represented by the following expression (1):

$$2C \leq nC \leq 60C \qquad (1)$$

where C is a rated capacity value of the lithium ion secondary battery, and n is a number of 2 to 60.

As the constant current charging proceeds, the voltage value $\Delta E$ of the lithium ion secondary battery 1 rises. The control unit 115 carries out such control as to continue the constant current charging until the voltage value $\Delta E$ of the lithium ion secondary battery 1 reaches a set voltage value $\Delta E1$ (S2). While performing the constant current charging as such (S1 and S2), the control unit 115 monitors the voltage value $\Delta E$ of the lithium ion secondary battery 1 detected by the voltage detector 113, and compares the voltage value $\Delta E$ with the set voltage value $\Delta E1$. When the voltage value $\Delta E$ of the lithium ion secondary battery 1 reaches the set voltage value $\Delta E1$, the control unit 115 terminates the constant current charging (S3). The constant current charging may be terminated in a period preset by an action of the timer 116.

A specific example of the case where a lithium ion secondary battery is charged by the charging step mentioned above will now be explained in detail.

Figure 5:
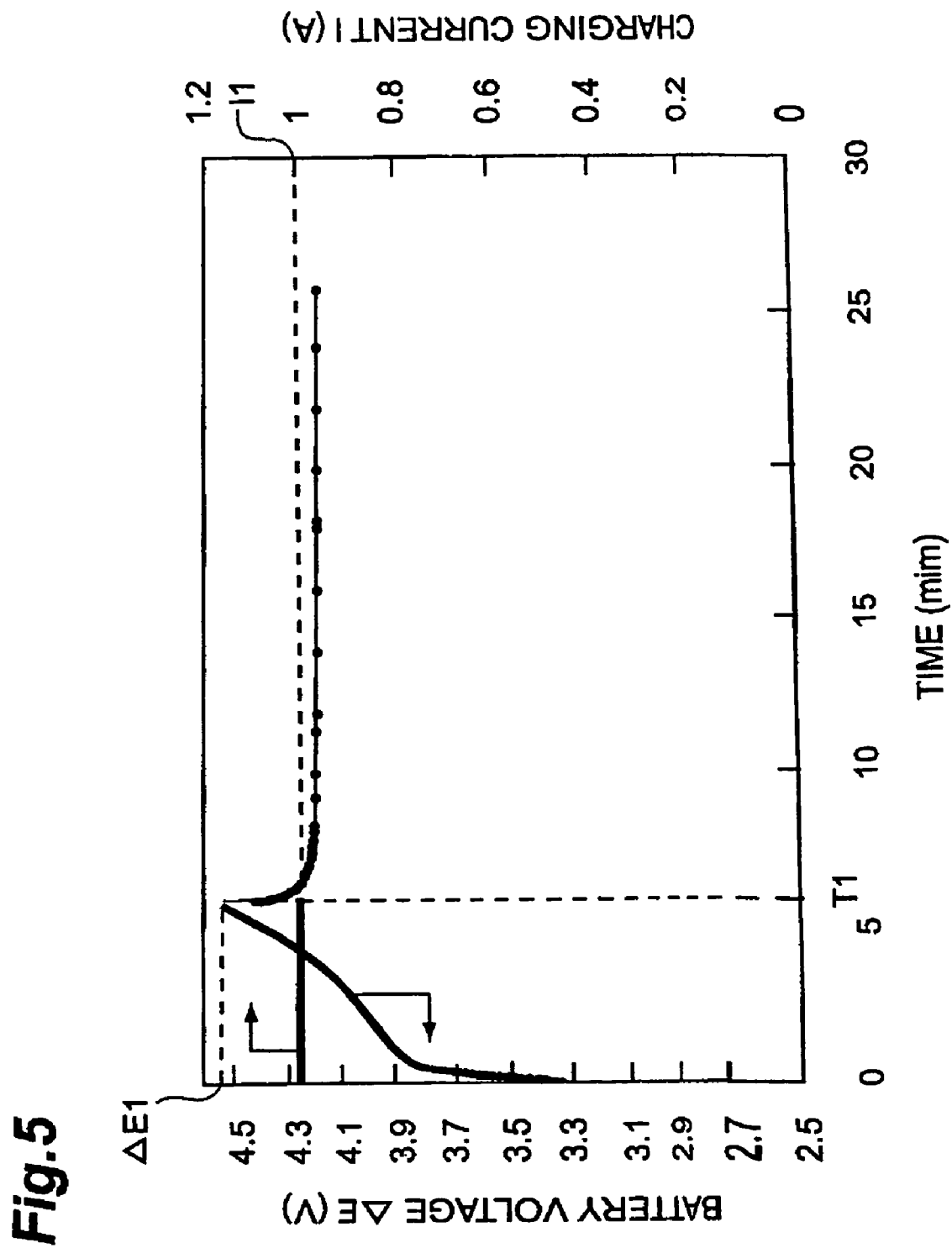
FIG. 5 is a graph showing an example of profiles of changes in the battery voltage of a lithium ion secondary battery and charging current with time.

FIG. 5 is a graph showing an example of profile of changes in battery voltage and charging current with time. This graph illustrates profiles of changes in battery voltage and charging current with time when the lithium ion secondary battery 1 using $LiMn_{1/3}Ni_{1/3}Co_{1/3}O_2$ and synthetic graphite as positive and negative electrode active materials, respectively, is subjected to constant current charging at a current value (1 A) corresponding to a set charging current value I1 of 10C (where C is a rated capacity value 0.1 Ah of the lithium ion secondary battery 1) First, the control unit 115 starts such constant current charging (S1) as to keep the charging current I at the set charging current value I1 (1 A), whereby the voltage value $\Delta E$ rises as the constant current charging proceeds. While monitoring the voltage value $\Delta E$ of the lithium ion secondary battery 1 detected by the voltage detector 113, the control unit 115 carries out such control as to further continue the constant current charging (S2) until the voltage value $\Delta E$ reaches a set voltage value $\Delta E1$ (4.5 V) which has been set beforehand. The control unit 115 terminates the constant current charging at a point where the voltage value $\Delta E$ reaches the set voltage value $\Delta E1$ (4.5 V) (S3). In this case, the charging time spans from the starting of constant current charging (0 minute) to the point T1 where the constant current charging ends. In FIG. 5, the charging time is 5.8 minutes, whereby the charging is carried out in a time shorter than that conventionally required.

Another embodiment of the method of charging a lithium ion secondary battery in accordance with the present invention using the charging apparatus 2 shown in FIG. 3 will now be explained.

Figure 6:
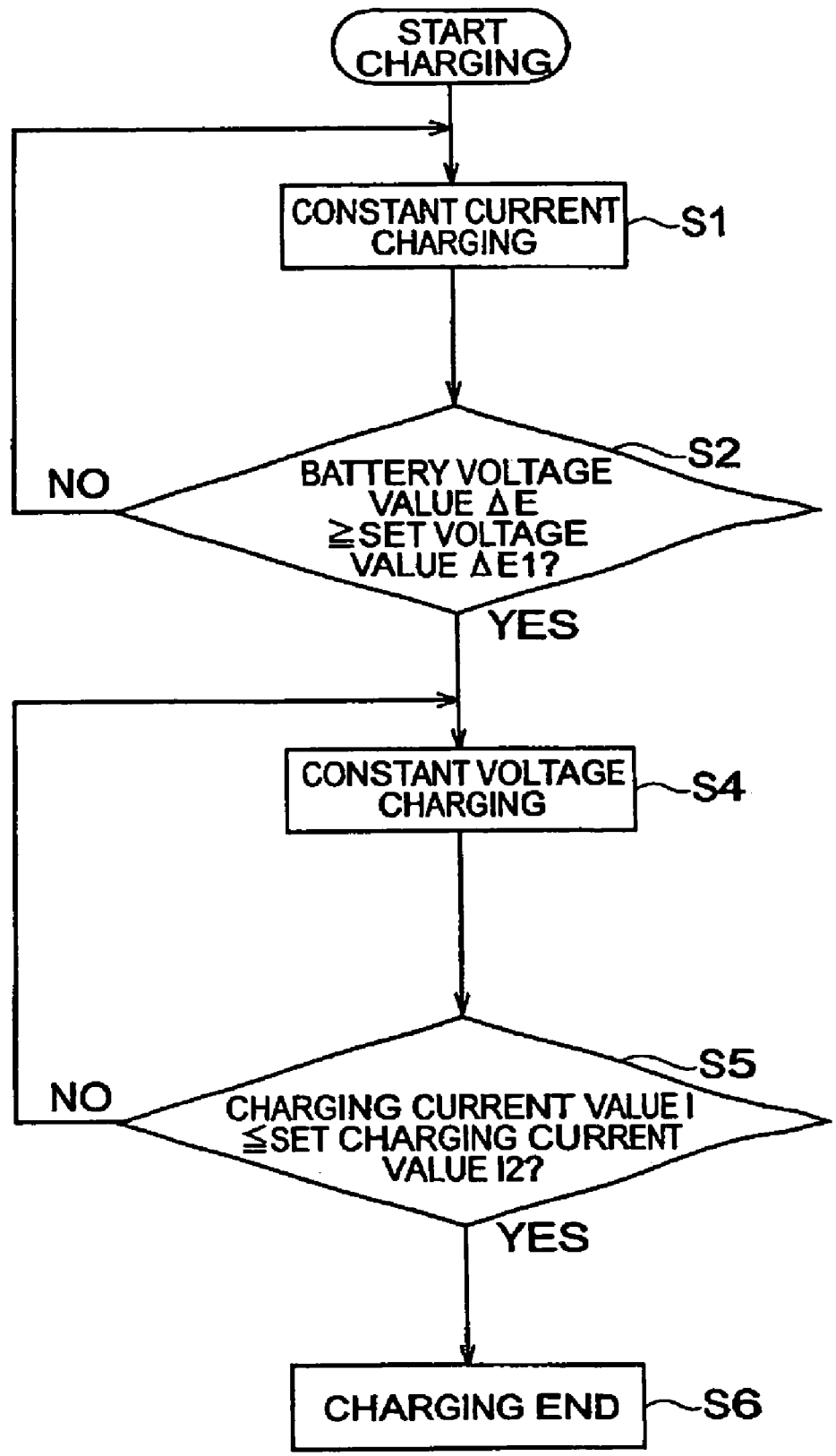
FIG. 6 is a flowchart showing a preferred example of the charging step in the method of charging a lithium ion secondary battery in accordance with the present invention.

FIG. 6 is a flowchart showing a preferred example of charging step in the method of charging a lithium ion secondary battery in accordance with the present invention. This flowchart illustrates an example of charging control procedure when carrying out constant current constant voltage charging. The start of charging, S1, and S2 are the same as those in the charging control explained in FIG. 4. In FIG. 6, after S2, the control unit 115 carries out such constant voltage charging as to keep the charging voltage value $\Delta E$ at a set voltage value $\Delta E1$ by regulating the output voltage controller 114 according to the voltage value $\Delta E$ of the lithium ion secondary battery 1 detected by the voltage detector 113 (S4). The charging current value I decreases as the constant voltage charging proceeds. The control unit 115 carries out such control as to further continue the constant voltage charging until the charging current value I reaches a set current value I2 (S5). At S5, the control unit 115 monitors the charging current value I detected by the current detector 111, and compares the charging current value I and the set current value I2 with each other. The control unit 115 terminates the constant voltage charging when the charging current value I reaches the set current value I2 (S6). The set current value I2 is appropriately set in conformity to an aimed charging rate of the lithium ion secondary battery 1.

A specific example of the case where the lithium ion secondary battery is charged by the charging step mentioned above will now be explained in detail.

Figure 7:
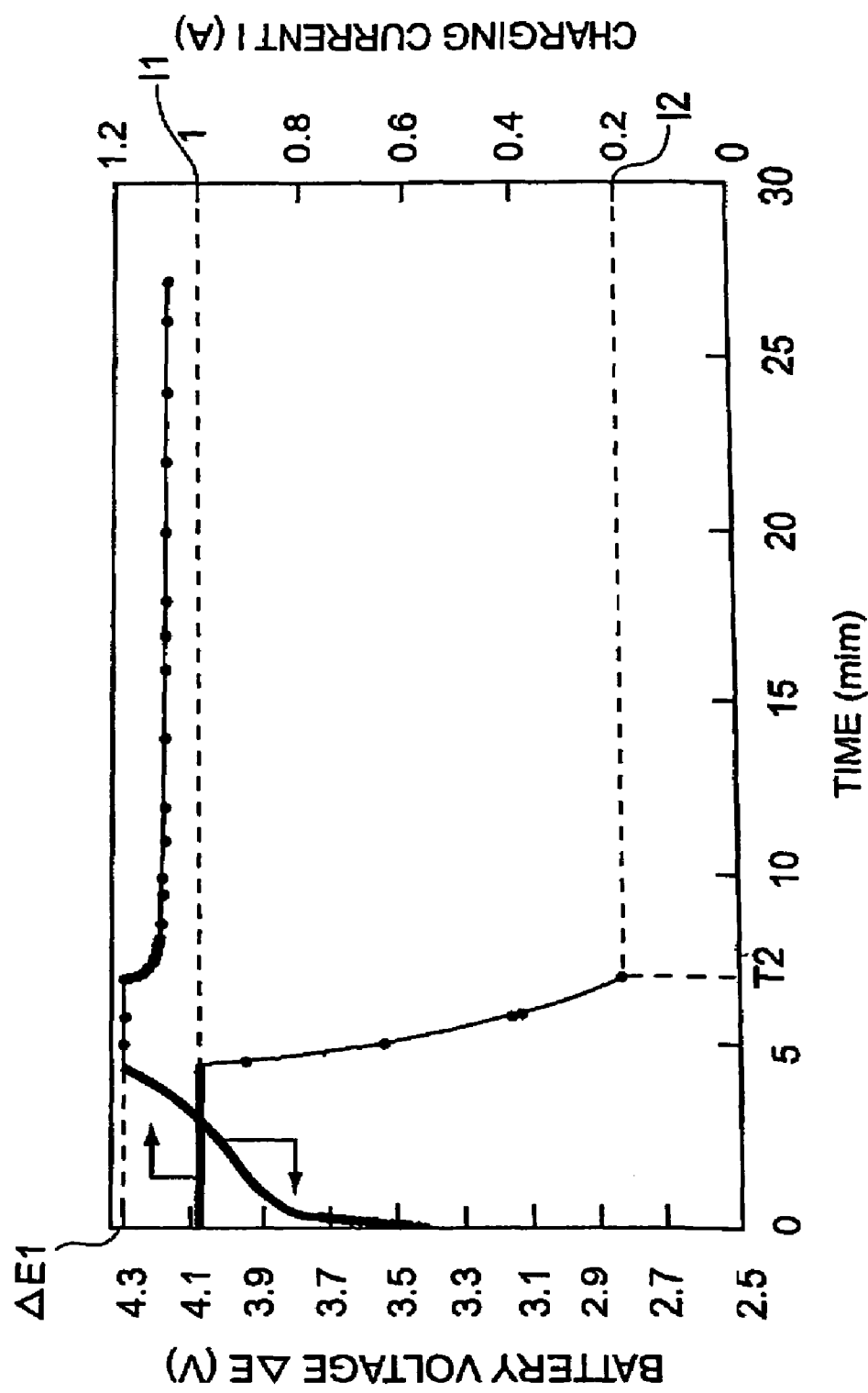
FIG. 7 is a graph showing an example of profiles of changes in the battery voltage of a lithium ion secondary battery and charging current with time.

FIG. 7 is a graph showing an example of profile of changes in battery voltage and charging current with time. This graph illustrates profiles of changes in battery voltage and charging current with time when the lithium ion secondary battery 1 using $LiMn_{1/3}Ni_{1/3}Co_{1/3}O_2$ and synthetic graphite as positive and negative electrode active materials, respectively, is subjected to constant current charging at a current value (1 A) corresponding to a set charging current value I1 of 10C (where C is a rated capacity value 0.1 Ah of the lithium ion secondary battery 1) and constant voltage charging at a set voltage value ΔE1 of +4.3 V. First, the control unit 115 starts such constant current charging (S1) as to keep the charging current I at the set charging current value I1 (1 A), whereby the voltage value ΔE of the lithium ion secondary battery rises as the constant current charging proceeds While monitoring the voltage value ΔE of the lithium ion secondary battery 1 detected by the voltage detector 113, the control unit 115 carries out such control as to further continue the constant current charging (S2) until the voltage value ΔE reaches a set voltage value ΔE1 (+4.3 V) which has been set beforehand. When the voltage value ΔE reaches the set voltage value ΔE1 (+4.3 V), the control unit 115 terminates the constant current charging, and subsequently carries out constant voltage charging (S4) while regulating the output voltage controller 114 such that the voltage value ΔE of the lithium ion secondary battery 1 detected by the voltage detector 113 is held at the set voltage value ΔE1 (+4.3 V). After the constant voltage charging is started, the charging current value I lowers as the charging proceeds. While monitoring the charging current value I detected by the current detector 111, the control unit 115 carries out such control as to further continue the constant voltage charging (S5) until the charging current value I reaches a set current value I2 which has been set beforehand. When the charging current value I reaches the set current value I2, the control unit 115 terminates the constant voltage charging (S6). In this case, the charging time spans from the starting of constant voltage charging (0 minute) to the point T2 where the constant voltage charging ends. In FIG. 7, the set current value I2 is 0.2 A, whereas the charging time is 7.1 minutes. The charging is carried out in a time shorter than that conventionally required in this charging step as well.

Figure 8:
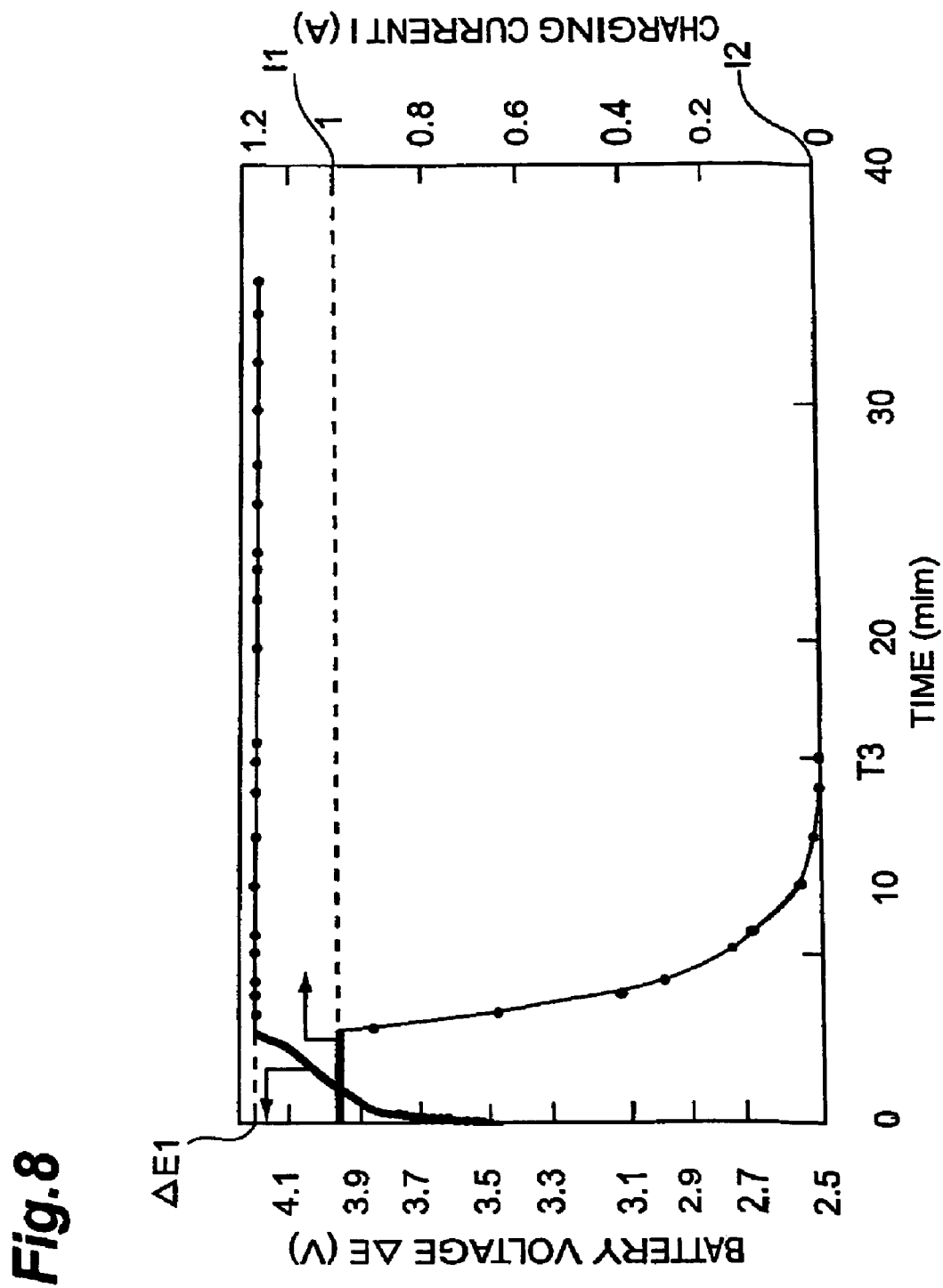
FIG. 8 is a graph showing an example of profiles of changes in the battery voltage of a lithium ion secondary battery and charging current with time.

FIG. 8 is a graph showing an example of profile of changes in battery voltage and charging current with time. This graph illustrates profiles of changes in battery voltage and charging current with time when the lithium ion secondary battery 1 using $LiMn_{1/3}Ni_{1/3}Co_{1/3}O_2$ and synthetic graphite as positive and negative electrode active materials, respectively, is subjected to constant current charging at a current value (1 A) corresponding to a set charging current value I1 of 10C (where C is a rated capacity value 0.1 Ah of the lithium ion secondary battery 1) and constant voltage charging at a set voltage value ΔE1 of +4.2 V. First, the control unit 115 starts such constant current charging (S1) as to keep the charging current I at the set charging current value I1 (1 A), whereby the voltage value ΔE of the lithium ion secondary battery rises as the constant current charging proceeds. While monitoring the voltage value ΔE of the lithium ion secondary battery 1 detected by the voltage detector 113, the control unit 115 carries out such control as to further continue the constant current charging (S2) until the voltage value ΔE reaches a set voltage value ΔE1 (+4.2 V) which has been set beforehand. When the voltage value ΔE reaches the set voltage value ΔE1 (+4.2 V), the control unit 115 terminates the constant current charging, and subsequently carries out constant voltage charging (S4) while regulating the output voltage controller 114 such that the voltage value ΔE of the lithium ion secondary battery 1 detected by the voltage detector 113 is held at the set voltage value ΔE1 (+4.2 V). After the constant voltage charging is started, the charging current value I lowers as the charging proceeds. While monitoring the charging current value I detected by the current detector 111, the control unit 115 carries out such control as to further continue the constant voltage charging (S5) until the charging current value I reaches a set current value I2 which has been set beforehand. When the charging current value I reaches the set current value I2, the control unit 115 terminates the constant voltage charging (S6). In this case, the charging time spans from the starting of constant voltage charging (0 minute) to the point T3 where the constant voltage charging ends. In FIG. 8, the set current value I2 is 5 mA, whereas the charging time is 15.2 minutes. The charging is carried out in a time shorter than that conventionally required in this charging step as well.

Though preferred embodiments of the present invention are explained in the foregoing, the present invention is not limited to the above-mentioned embodiments.

For example, one set voltage value ΔE1 can be set within the range of +4.3 V to +5.0 V when the negative electrode active material is a conductive carbon material as in the embodiments shown in FIGS. 5 and 7. When lithium titanate is used as the negative electrode active material, on the other hand, one set voltage value ΔE1 can be set within the range of +2.8 V to +3.5 V.

Figure 9:
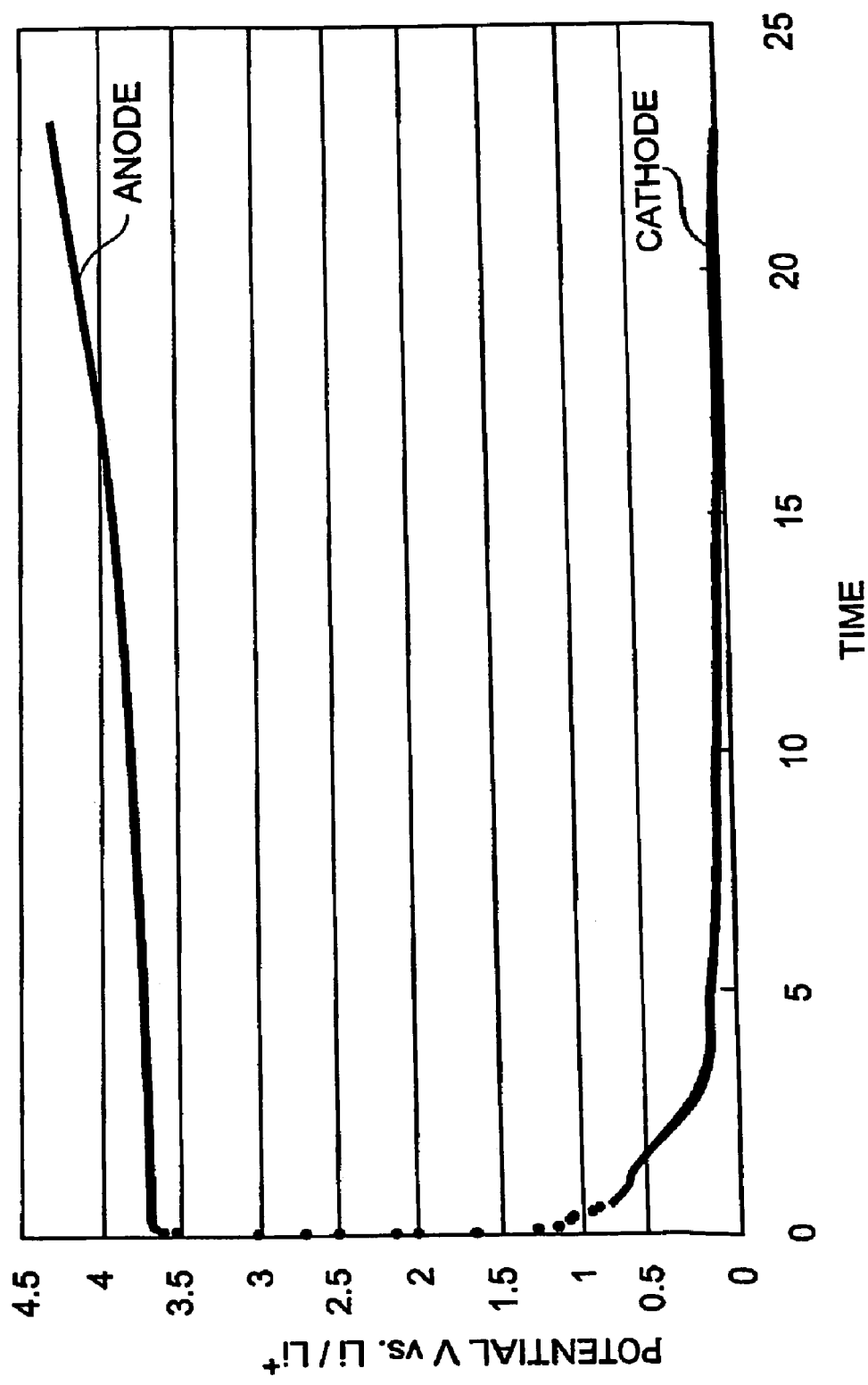
FIG. 9 is a graph showing an example of profiles of changes in potentials of an anode and a cathode with time when a lithium ion secondary battery is subjected to constant current charging.
Figure 10:
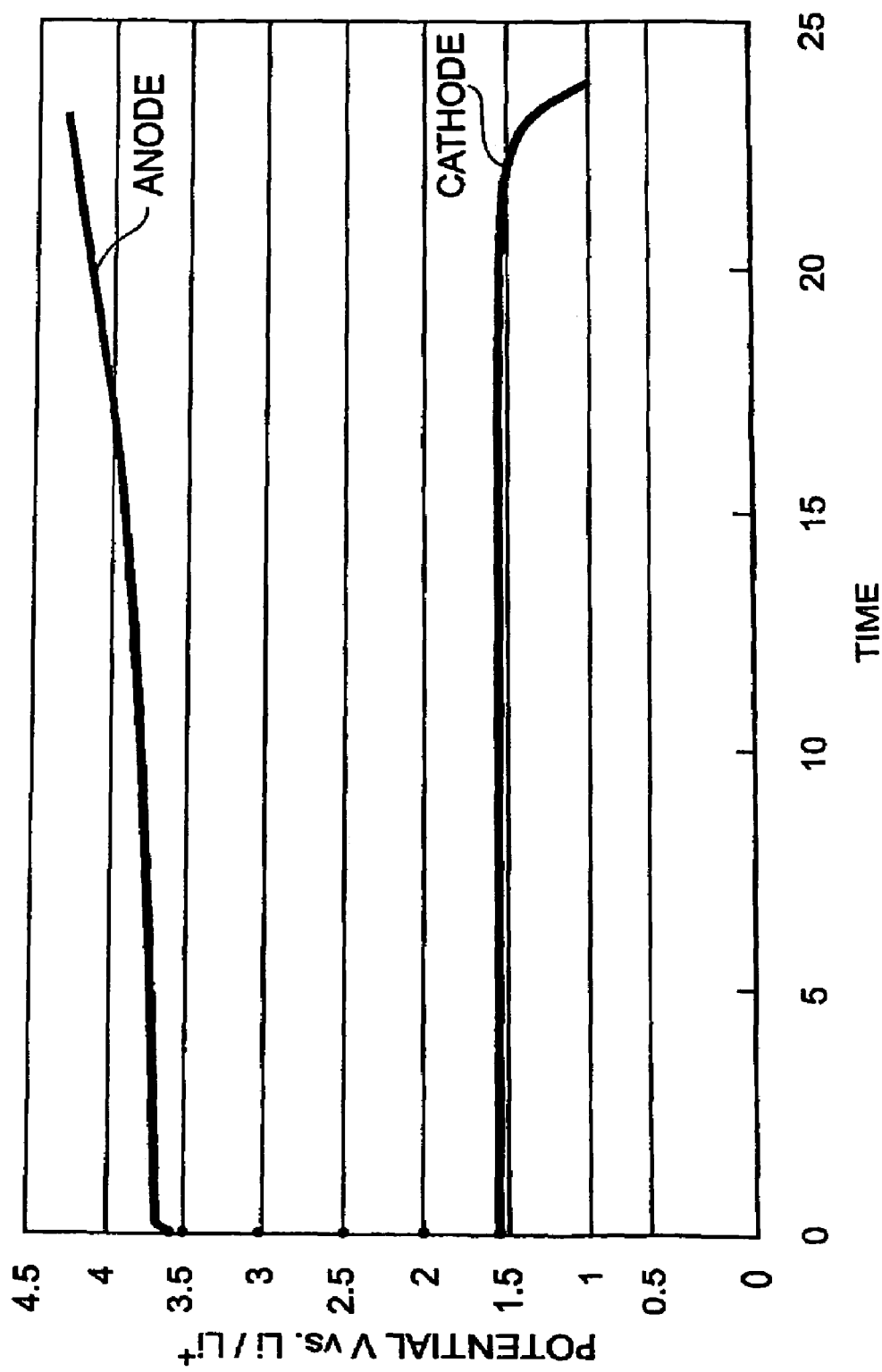
FIG. 10 is a graph showing an example of profiles of changes in potentials of an anode and a cathode with time when a lithium ion secondary battery is subjected to constant current charging.

FIGS. 9 and 10 are graphs showing examples of profiles of changes in anode potential [V vs. Li/Li$^+$] and cathode potential [V vs. Li/Li$^+$] with time when two species of lithium ion secondary batteries whose negative electrode active materials differ from each other are subjected to constant current charging under the same condition. A lithium ion secondary battery using $LiMn_{1/3}Ni_{1/3}Co_{1/3}O_2$ and synthetic graphite as positive and negative electrode active materials, respectively, is subjected to constant current charging in FIG. 9; whereas a lithium ion secondary battery using $LiMn_{1/3}Ni_{1/3}Co_{1/3}O_2$ and lithium titanate as positive and negative electrode active materials, respectively, is subjected to constant current charging in FIG. 10. In each graph, the electrode containing the positive electrode active material is an anode. The anode potential may be used for regulating the constant current charging step and constant voltage charging step when the anode potential can be monitored as in FIGS. 9 and 10.

When the anode potential E [V vs. SHE] can be monitored in the constant current charging step of FIG. 5 (e.g., when the charging control part 102 comprises means for measuring the anode potential [V vs. SHE]), control can be carried out so as to continue the constant current charging until the potential E reaches a set potential E1 set within the range of +1.3 V to +2.0 V, and the set potential E1 can be set within the same range even when the negative electrode active material is changed to lithium titanate.

Figure 11:
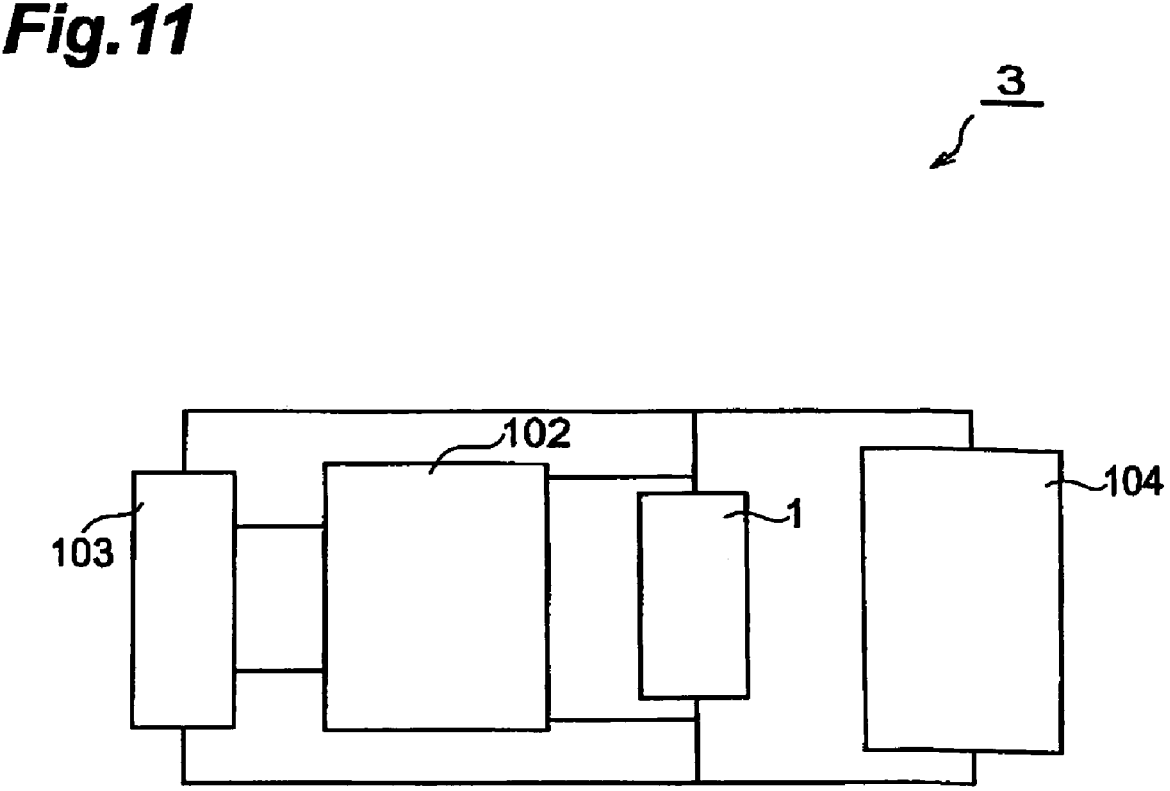
FIG. 11 is a system diagram showing the basic configuration of a preferred embodiment of the power supply apparatus in accordance with the present invention.

FIG. 11 is a system diagram showing the basic configuration of a preferred embodiment of the power supply apparatus in accordance with tile present invention.

The power supply apparatus 3 shown in FIG. 11 comprises, at least, a lithium ion secondary battery 1 and the charging apparatus of the present invention operable according to the method of charging a lithium ion secondary battery in accordance with the present invention as constituents. The power supply apparatus 3 comprises the lithium ion secondary battery 1, a power supply part 103 and a charging control part 102 as constituents of the charging apparatus, and a part to be supplied with power 104.

The charging control part 102 is electrically connected to the power supply part 103, and further to the lithium ion secondary battery 1. The power supply part 103 and the lithium ion secondary battery 1 are electrically connected to each other. As mentioned above, they act such that the lithium ion secondary battery 1 is charged according to the method of charging a lithium ion secondary battery in accordance with the present invention. The power supply part 103 and the part to be supplied with power 104 are electrically connected to each other, whereas the lithium ion secondary battery 1 and the part to be supplied with power 104 are electrically connected to each other. The part to be supplied with power 104 is a device operable by power, such as a motor, and is powered by the power supply part 103 and lithium ion secondary battery 1. The species of the part to be supplied with power is not restricted in particular in the present invention. It will be sufficient if the power supply apparatus 3 has such a configuration that the lithium ion secondary battery 1 and power supply part 103 are used while being electrically connected to the part to be supplied with power 104.

The lithium ion secondary battery 1 provided in the power supply apparatus 3 is charged according to the method of charging a lithium ion secondary battery in accordance with the present invention, accumulates power in a time shorter than that conventionally required without remarkably deteriorating the charging/discharging cycle characteristic, and acts as a main power supply or auxiliary power supply when necessary, so as to supply the power to the part to be supplied with power 104. Such a power supply apparatus 3 can be utilized as a driving source for portable devices which are required to be charged rapidly, for example.

Though a preferred embodiment of the power supply apparatus in accordance with the present invention is explained in the foregoing, the present invention is not restricted thereto.

EXAMPLES

The present invention will now be explained in further detail with reference to Examples and Comparative Examples, though these Examples do not restrict the present invention at all.

In the following procedure, lithium ion secondary batteries of Examples 1 to 9 and Comparative Examples 1 to 5, each having a configuration similar to that of the lithium ion secondary battery 1 shown in FIG. 1, were made.

Example 1

A negative electrode was made. First, synthetic graphite (90 mass parts) as a negative electrode active material, carbon black (2 mass parts) as a conductive auxiliary agent, and polyvinylidene fluoride (PVDF) (8 mass parts) as a binder were mixed by a planetary mixer, and the viscosity of the mixture was adjusted with an; appropriate amount of N-methylpyrrolidone (NMP) as a solvent, so as to yield a slurry. Thus obtained slurry was applied to an electrolytic copper foil (16 μm), acting as a collector, by doctor blading such that the negative electrode active material carrying amount became 14.5 mg/cm$^2$, and then was dried at 110° C. for 20 minutes, so as to form a negative electrode active material containing layer. After drying, the layer was extended by calender rolls such that the resulting negative electrode attained a porosity of 30%, and then was punched out into a piece of 17.5 mm×32.5 mm, whereby the negative electrode was obtained.

Next, a positive electrode was made. First, LiMn$_{1/3}$Ni$_{1/3}$Co$_{1/3}$O$_2$ (90 mass parts) as a positive electrode active material, acetylene black (6 mass parts) as a conductive auxiliary agent, and PVDF (4 mass parts) were mixed by a planetary mixer, and the viscosity of the mixture was adjusted with an appropriate amount of N-methylpyrrolidone (NMP) as a solvent, so as to yield a slurry. Thus obtained slurry was applied to an aluminum foil (20 μm), acting as a collector, by doctor blading such that the positive electrode active material carrying amount became 26.5 mg/cm$^2$, and then was dried at 110° C. for 20 minutes, so as to form a positive electrode active material containing layer. After drying, the layer was extended by calender rolls such that the resulting positive electrode attained a porosity of 35%, and then was punched out into a piece of 17 mm×32 mm, whereby the positive electrode was obtained.

The nonaqueous electrolytic solution was prepared as follows. First, a mixture in which propylene carbonate (hereinafter referred to as PC as the case may be), ethylene carbonate (hereinafter referred to as EC as the case may be), and diethyl carbonate (hereinafter referred to as DEC as the case may be) were mixed at a volume ratio of PC:EC:DEC=2:1:7 was employed as a nonaqueous solvent, and LiPF$_6$ was added thereto as a solute at a rate of 1.5 mol dm$^{-3}$. For restraining PC from decomposing, 5% of vinylene carbonate was further added thereto.

Thus obtained negative electrode and positive electrode were laminated with a separator, so as to yield a laminate in which the separator was held between the negative and positive electrodes. The resulting laminate was put into an aluminum laminate pack. The aluminum laminate pack was sealed in vacuum after the nonaqueous electrolytic solution was injected therein, whereby a lithium ion secondary battery (having a length of 43 mm, a width of 20 mm, a thickness of 2.5 mm, and a rated capacity of 100 mAh) was made. Employed as a film for the aluminum laminate pack was a laminate in which the innermost layer made of a synthetic resin (layer made of denatured polypropylene) in contact with the nonaqueous electrolytic solution, a metal layer made of an aluminum foil, and a layer made of polyamide were laminated in this order. Two such composite package films were overlaid on each other and their fringes were heat-sealed.

Thus obtained lithium ion secondary battery was subjected to constant current charging at a current value (200 mA) corresponding to a charging current value of 2C at 25° C. until the voltage value became 4.7 V, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition. A charging/discharging cycle characteristic was evaluated by the ratio between the discharging capacities A1 and A2 [100×(A2/A1)] [%] after repeating the charging and discharging 10 times. Batteries yielding the ratio of 97.5% or greater were considered to have a sufficient charging/discharging cycle characteristic in practice. Results obtained are shown in Table 1.

Example 2

A lithium ion secondary battery (having a rated capacity of 100 mAh) was made as in Example 1 except that the positive electrode active material carrying amount was 8.0 mg/cm$^2$, and that the negative electrode active material carrying amount was 4.5 mg/cm$^2$.

Thus obtained lithium ion secondary battery was subjected to constant current charging at a current value (500 mA) corresponding to a charging current value of 5C at 25° C. until the voltage value became 4.5 V, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Example 3

A lithium ion secondary battery (having a rated capacity of 100 mAh) was made as in Example 1 except that the positive electrode active material carrying amount was 5.5 mg/cm$^2$, and that the negative electrode active material carrying amount was 3.5 mg/cm$^2$.

Thus obtained lithium ion secondary battery was subjected to constant current charging at a current value, (1000 mA) corresponding to a charging current value of 10C at 25° C. until the voltage value became 4.5 V, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Thus obtained results are shown in Table 1.

Example 4

A lithium ion secondary battery (having a rated capacity of 100 mAh) was made as in Example 3.

Thus obtained lithium ion secondary battery was subjected to constant current charging at a current value (3000 mA) corresponding to a charging current value of 30C at 25° C. until the voltage value became 4.2 V, and then to such constant voltage charging as to keep the voltage value of 4.2 V until the charging current value decreased to 5 mA, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Example 5

A lithium ion secondary battery (having a rated capacity of 100 mAh) was made as in Example 2.

Thus obtained lithium ion secondary battery was subjected to constant current charging at a current value (500 mA) corresponding to a charging current value of 5C at 25° C. until the voltage value became 4.2 V, and then to such constant voltage charging as to keep the voltage value of 4.2 V until the charging current value decreased to 5 mA, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Example 6

A lithium ion secondary battery (having a rated capacity of 100 mAh) was made as in Example 3.

Thus obtained lithium ion secondary battery was subjected to constant current charging at a current value (1000 mA) corresponding to a charging current value of 10C at 25° C. until the voltage value became 4.2 V, and then to such constant voltage charging as to keep the voltage value of 4.2 V until the charging current value decreased to 5 mA, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Example 7

A lithium ion secondary battery (having a rated capacity of 100 mAh) was made as in Example 1 except that $LiMn_{0.3}Ni_{0.55}Co_{0.15}O_2$ was used in place of $LiMn_{1/3}Ni_{1/3}Co_{1/3}O_2$ as a positive electrode active material.

Thus obtained lithium ion secondary battery was subjected to constant current charging at a current value (200 mA) corresponding to a charging current value of 2C at 25° C. until the voltage value became 4.7 V, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Example 8

A lithium ion secondary battery (having a rated capacity of 100 mAh) was made as in Example 1 except that $LiMn_{0.42}Ni_{0.42}Co_{0.16}O_2$ was used in place of $LiMn_{1/3}Ni_{1/3}Co_{1/3}O_2$ as a positive electrode active material.

Thus obtained lithium ion secondary battery was subjected to constant current charging at a current value (200 mA) corresponding to a charging current value of 2C at 25° C. until the voltage value became 4.7 V, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Example 9

A lithium ion secondary battery (having a rated capacity of 100 mAh) was made as in Example 3 except that lithium titanate was used as a negative electrode active material in place of synthetic graphite, and that the negative electrode active material carrying amount was 5.5 mg/cm$^2$.

Thus obtained lithium ion secondary battery was subjected to constant current charging at a current value (1000 mA) corresponding to a charging current value of 10C at 25° C. until the voltage value became 3.0 V, and the time required for attaining full charge was measured. Next, constant current discharging was performed at 1C until the voltage value became 1.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Example 10

A lithium ion secondary battery (having a rated capacity of 100 mAh) was made as in Example 3.

Thus obtained lithium ion secondary battery was subjected to constant current charging at a current value (1000 mA) corresponding to a charging current value of 10C at 25° C. until the voltage value became 4.3 V, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Comparative Example 1

A lithium ion secondary battery (having a rated capacity of 100 mAh) was made as in Example 1.

Thus obtained lithium ion secondary battery was subjected to constant current charging at a current value (100 mA) corresponding to a charging current value of 1C at 25° C. until the voltage value became 4.2 V, and then to such constant voltage charging as to keep the voltage value of 4.2 V until the charging current value decreased to 5 mA, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Comparative Example 2

A lithium ion secondary battery (having a rated capacity of 100 mAh) was made as in Example 2.

Thus obtained lithium ion secondary battery was subjected to constant current charging at a current value (100 mA) corresponding to a charging current value of 1C at 25° C. until the voltage value became 4.2 V, and then to such constant voltage charging as to keep the voltage value of 4.2 V until the charging current value decreased to 5 mA, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Comparative Example 3

A lithium ion secondary battery (having a rated capacity of 100 mAh) was made as in Example 3.

Thus obtained lithium ion secondary battery was subjected to constant current charging at a current value (100 mA) corresponding to a charging current value of 1C at 25° C. until the voltage value became 4.2 V, and then to such constant voltage charging as to keep the voltage value of 4.2 V until the charging current value decreased to 5 mA, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Comparative Example 4

A lithium ion secondary battery (having a rated capacity of 100 mAh) was made as in Example 3 except that LiCoO$_2$ was used in place of LiMn$_{1/3}$Ni$_{1/3}$Co$_{1/3}$O$_2$ as a positive electrode active material.

Thus obtained lithium ion secondary battery was subjected to constant current charging at a current value (1000 mA) corresponding to a charging current value of 10C at 25° C. until the voltage value became 4.5 V, and the time required for attaining full charge was measured. Next, constant current discharging was performed at 1C until the voltage value became 2.5 V, and a discharging capacity A1 was measured. Further, a discharging capacity A2 was measured after repeating the charging and discharging 10 times under the same condition, and a charging/discharging cycle characteristic was evaluated as in Example 1. Results obtained are shown in Table 1.

Comparative Example 5

A lithium ion secondary battery (having a rated capacity of 100 mAh) was made as in Example 9.

Thus obtained lithium ion secondary battery was subjected to constant current charging at a current value (100 mA) corresponding to a charging current value of 1C at 25° C. until the voltage value became 2.7 V, and the time required for attaining full charge was measured. Next, constant current discharging was performed at 1C until the voltage value became 1.5 V, and a discharging capacity A1 was measured. Further, a discharging capacity A2 was measured after repeating the charging and discharging 10 times under the same condition, and a charging/discharging cycle characteristic was evaluated as in Example 1. Results Obtained are shown in Table 1.

TABLE 1

| | POSITIVE ELECTRODE | | NEGATIVE ELECTRODE | | CHARGING CONDITION | | | | CHARGING/DISCHARGING CYCLE |
|---|---|---|---|---|---|---|---|---|---|
| | ACTIVE MATERIAL | CARRYING AMOUNT (mg/cm$^2$) | ACTIVE MATERIAL | CARRYING AMOUNT (mg/cm$^2$) | CHARGING METHOD$^a$ | CONSTANT CURRENT VALUE (C) | CONSTANT VOLTAGE VALUE (V) | CHARGING TIME (MIN) | CHARACTERISTIC (%) |
| EXAMPLE 1 | LiMn$_{1/3}$Ni$_{1/3}$Co$_{1/3}$O$_2$ | 26.5 | SYNTHETIC GRAPHITE | 14.5 | CC | 2 | 4.7$^b$ | 30 | 97.8 |
| EXAMPLE 2 | LiMn$_{1/3}$Ni$_{1/3}$Co$_{1/3}$O$_2$ | 8.0 | SYNTHETIC GRAPHITE | 4.5 | CC | 5 | 4.8$^b$ | 12 | 98.7 |
| EXAMPLE 3 | LiMn$_{1/3}$Ni$_{1/3}$Co$_{1/3}$O$_2$ | 5.5 | SYNTHETIC GRAPHITE | 3.5 | CC | 10 | 4.6$^b$ | 6 | 99.0 |
| EXAMPLE 4 | LiMn$_{1/3}$Ni$_{1/3}$Co$_{1/3}$O$_2$ | 5.5 | SYNTHETIC GRAPHITE | 3.5 | CCCV | 30 | 4.2 | 12 | 98.0 |
| EXAMPLE 5 | LiMn$_{1/3}$Ni$_{1/3}$Co$_{1/3}$O$_2$ | 8.0 | SYNTHETIC GRAPHITE | 4.5 | CCCV | 5 | 4.2 | 38 | 99.0 |
| EXAMPLE 6 | LiMn$_{1/3}$Ni$_{1/3}$Co$_{1/3}$O$_2$ | 5.5 | SYNTHETIC GRAPHITE | 3.5 | CCCV | 10 | 4.2 | 15 | 99.8 |
| EXAMPLE 7 | LiMn$_{0.3}$Ni$_{0.55}$Co$_{0.15}$O$_2$ | 26.5 | SYNTHETIC GRAPHITE | 14.5 | CC | 2 | 4.7$^b$ | 30 | 98.0 |
| EXAMPLE 8 | LiMn$_{0.42}$Ni$_{0.42}$Co$_{0.16}$O$_2$ | 26.5 | SYNTHETIC GRAPHITE | 14.5 | CC | 2 | 4.7$^b$ | 30 | 97.7 |
| EXAMPLE 9 | LiMn$_{1/3}$Ni$_{1/3}$Co$_{1/3}$O$_2$ | 5.5 | LITHIUM TITANATE | 5.5 | CC | 10 | 3.0$^b$ | 6 | 99.3 |
| EXAMPLE 10 | LiMn$_{1/3}$Ni$_{1/3}$Co$_{1/3}$O$_2$ | 5.5 | SYNTHETIC GRAPHITE | 3.5 | CCCV | 10 | 4.3 | 7 | 99.0 |
| COMPARATIVE EXAMPLE 1 | LiMn$_{1/3}$Ni$_{1/3}$Co$_{1/3}$O$_2$ | 26.5 | SYNTHETIC GRAPHITE | 14.5 | CCCV | 1 | 4.2 | 110 | 98.3 |
| COMPARATIVE EXAMPLE 2 | LiMn$_{1/3}$Ni$_{1/3}$Co$_{1/3}$O$_2$ | 8.0 | SYNTHETIC GRAPHITE | 4.5 | CCCV | 1 | 4.2 | 90 | 99.9 |
| COMPARATIVE EXAMPLE 3 | LiMn$_{1/3}$Ni$_{1/3}$Co$_{1/3}$O$_2$ | 5.5 | SYNTHETIC GRAPHITE | 3.5 | CCCV | 1 | 4.2 | 70 | 100.0 |
| COMPARATIVE EXAMPLE 4 | LiCoO$_2$ | 5.5 | SYNTHETIC GRAPHITE | 3.5 | CC | 10 | 4.5$^b$ | 6 | 93.0 |
| COMPARATIVE EXAMPLE 5 | LiMn$_{1/3}$Ni$_{1/3}$Co$_{1/3}$O$_2$ | 5.5 | LITHIUM TITANATE | 5.5 | CCCV | 1 | 2.7 | 115 | 100.0 |

$^a$CC STANDS FOR CONSTANT CURRENT CHARGING; CCCV STANDS FOR CONSTANT CURRENT CONSTANT VOLTAGE CHARGING.
$^b$UPPER LIMIT VOLTAGE VALUE IN CONSTANT CURRENT CHARGING.

As can be seen from the results shown in Table 1, all of Examples 1 to 10, which belong to the method of charging a lithium ion secondary battery in accordance with the present invention, have shortened the charging time without greatly lowering the charging/discharging cycle characteristic.

A comparison of Examples 4, 5, and 6 with Comparative Examples 1, 2, and 3 shows that the charging time is shortened without greatly lowering the charging/discharging characteristic in the case where the charging current value in the constant current charging is set higher when lithium ion secondary batteries using LiMn$_{1/3}$Ni$_{1/3}$Co$_{1/3}$O$_2$ as a positive electrode active material are subjected to constant current constant voltage charging. Also, Examples 1, 2, and 3, which set a higher charging current value and a higher upper limit voltage value in constant current charging when lithium ion secondary batteries using LiMn$_{1/3}$Ni$_{1/3}$Co$_{1/3}$O$_2$ as a positive electrode active material are subjected to constant current charging, further shorten the charging time without greatly lowering the charging/discharging cycle characteristic. By contrast, Comparative Example 4, in which a lithium ion secondary battery using LiCoO$_2$ as a positive electrode active material is subjected to constant current charging with a charging current value corresponding to 10C until the voltage value reaches 4.5 V, lowers the charging/discharging cycle characteristic while shortening the charging time.

The method of charging a lithium ion secondary battery, charging apparatus, and power supply apparatus in accordance with the present intention are useful as driving power supplies for devices requiring rapid charging, or their charging method and apparatus.

What is claimed is:

1. A method of charging a lithium ion secondary battery, the lithium ion secondary battery comprising 1) a positive electrode that includes a mixed metal oxide containing at least Li, Mn, and Ni as metal components as a positive electrode active material, 2) a negative electrode, and 3) a nonaqueous electrolytic solution containing a lithium salt, the method comprising:

constant current charging the lithium ion secondary battery with a set charging current value I1 corresponding to a set value nC satisfying a condition represented by an expression (1):

$$10C < nC \leq 60C \tag{1}$$

where C is a rated capacity value of the lithium ion secondary battery, and n is a number from 2 to 60, wherein
the mixed metal oxide simultaneously satisfies conditions of expressions (I) to (IV):

$$Li_xMn_yNi_zCo_{(1-y-z)}O_2 \tag{I}$$

$$0.85 \leq X \leq 1.1 \tag{II}$$

$$0.1 \leq Y \leq 0.5 \tag{III}$$

$$0.55 \leq Z \leq 0.8 \tag{IV}$$

where X, Y, and Z in expression (I) indicate values simultaneously satisfying the conditions of expressions (II) to (IV).

2. A method of charging a lithium ion secondary battery according to claim 1, wherein the set charging current value I1 is a charging current value corresponding to a set value nC satisfying a condition represented by an expression (2):

$$10C < nC \leq 30C \tag{2}$$

where C is defined as in the expression (1), and n is a number from 2 to 30.

3. A method of charging a lithium ion secondary battery according to claim 1, the method further comprising:
monitoring a potential of an anode [V vs. SHE] during the constant current charging and,
stopping the constant current charging when the potential reaches a set potential E1 within a range of +1.3 V to +2.0 V.

4. A method of charging a lithium ion secondary battery according to claim 3, further comprising:
constant voltage charging the lithium ion secondary battery to keep the set potential E1 after the constant current charging;
monitoring a constant voltage charging current value; and
stopping the constant voltage charging when the constant voltage charging current value reaches a set current value I2.

5. A method of charging a lithium ion secondary battery according to claim 1, further comprising:
monitoring a potential of an anode [V vs. SHE];
stopping the constant current charging when the potential reaches +1.2 V;
constant voltage charging the lithium ion secondary battery to keep the potential after the constant current charging;
monitoring a constant voltage charging current value; and
stopping the constant voltage charging when the constant voltage charging current value reaches a set current value I2.

6. A method of charging a lithium ion secondary battery according to claim 1, wherein the negative electrode contains a conductive carbon material as a negative electrode active material, further comprising:
monitoring a battery voltage;
stopping the constant current charging when the battery voltage reaches +4.2 V;
constant voltage charging the lithium ion secondary battery to keep a potential after the constant current charging;
monitoring a constant voltage charging current value; and
stopping the constant voltage charging when the constant voltage charging current value reaches a set current value I2.

7. A method of charging a lithium ion secondary battery according to claim 1, wherein the negative electrode contains lithium titanate as a negative electrode active material, further comprising:
monitoring a battery voltage;
stopping the constant current charging when the battery voltage reaches +2.7 V;
constant voltage charging the lithium ion secondary battery to keep a potential after the constant current charging;
monitoring a constant voltage charging current value; and
stopping the constant voltage charging when the constant voltage charging current value reaches a set current value I2.

8. A method of charging a lithium ion secondary battery according to claim 1, wherein a solvent contained in the nonaqueous electrolytic solution includes propylene carbonate, ethylene carbonate, and diethyl carbonate; and
wherein a content α of propylene carbonate volume percentage, a content β of ethylene carbonate volume percentage, and a content γ volume percentage of diethyl carbonate in the solvent simultaneously satisfy conditions represented by expressions (3) to (6):

$$10 \leq \alpha \leq 60 \tag{3}$$

$$1 \leq \beta \leq 20 \tag{4}$$

$$30 \leq \gamma \leq 85 \tag{5}$$

$$\alpha + \beta + \gamma = 100 \tag{6}$$

9. A method of charging a lithium ion secondary battery, the lithium ion secondary battery comprising 1) a positive electrode that includes a mixed metal oxide containing at least Li, Mn, and Ni as metal components as a positive electrode active material, 2) a negative electrode, and 3) a nonaqueous electrolytic solution containing a lithium salt, the method comprising:
constant current charging the lithium ion secondary battery with a set charging current value I1 corresponding to a set value nC satisfying a condition represented by an expression (1):

$$2C \leq nC \leq 60C \tag{1}$$

where C is a rated capacity value of the lithium ion secondary battery, and n is a number from 2 to 60;
monitoring a battery voltage, and
stopping the constant current charging when the battery voltage reaches a set voltage value ΔE1 within a range of +4.3 V to +5.0 V, wherein
the negative electrode contains a conductive carbon material as a negative electrode active material; wherein
the mixed metal oxide simultaneously satisfies conditions of expressions (I) to (IV):

$$Li_xMn_yNi_zCo_{(1-y-z)}O_2 \tag{I}$$

$$0.85 \leq X \leq 1.1 \tag{II}$$

$$0.1 \leq Y \leq 0.5 \tag{III}$$

$$0.55 \leq Z \leq 0.8 \tag{IV}$$

where X, Y, and Z in expression (I) indicate values simultaneously satisfying the conditions of expressions (II) to (IV).

10. A method of charging a lithium ion secondary battery according to claim 9, further comprising:
constant voltage charging the lithium ion secondary battery to keep the set voltage value ΔE1 after the constant current charging;
monitoring a constant voltage charging current value; and stopping the constant voltage charging when the constant voltage charging current value reaches a set current value I2.

11. A method of charging a lithium ion secondary battery, the lithium ion secondary battery comprising 1) a positive electrode that includes a mixed metal oxide containing at least Li, Mn, and Ni as metal components as a positive electrode active material, 2) a negative electrode, and 3) a nonaqueous electrolytic solution containing a lithium salt, the method comprising:

constant current charging the lithium ion secondary battery with a set charging current value I1 corresponding to a set value nC satisfying a condition represented by an expression (1):

$$2C \leq nC \leq 60C \tag{1}$$

where C is a rated capacity value of the lithium ion secondary battery, and n is a number from 2 to 60;

monitoring a battery voltage, and stopping the constant current charging when the battery voltage reaches a set voltage value ΔE1 within a range of +2.8 V to +3.5 V, wherein the negative electrode contains lithium titanate as a negative electrode active material; wherein the mixed metal oxide simultaneously satisfies conditions of expressions (I) to (IV):

$$Li_xMn_yNi_zCo_{(1-y-z)}O_2 \tag{I}$$

$$0.85 \leq X \leq 1.1 \tag{II}$$

$$0.1 \leq Y \leq 0.5 \tag{III}$$

$$0.55 \leq Z \leq 0.8 \tag{IV}$$

where X, Y, and Z in expression (I) indicate values simultaneously satisfying the conditions of expressions (II) to (IV).

12. A method of charging a lithium ion secondary battery according to claim 11, further comprising:

constant voltage charging the lithium ion secondary battery to keep the set voltage value ΔE1 after the constant current charging;

monitoring a constant voltage charging current value; and stopping the constant voltage charging when the constant voltage charging current value reaches a set current value I2.

13. A charging apparatus for charging a lithium ion secondary battery to be charged, the apparatus comprising:

a power supply part for supplying power to the lithium ion secondary battery; and a charging control part for controlling the power supply part in conformity to the method of charging according to claim 1 to regulate a charging rate of the lithium ion secondary battery.

14. A power supply apparatus comprising:

a lithium ion secondary battery; and the charging apparatus for charging the lithium ion secondary battery according to claim 13.

* * * * *